United States Patent
Fujiwara et al.

(10) Patent No.: US 9,465,279 B2
(45) Date of Patent: Oct. 11, 2016

(54) IMAGE PICKUP APPARATUS WITH MOVABLE LOCKING MEMBER

(71) Applicant: CANON KABUSHIKI KAISHA, Tokyo (JP)

(72) Inventors: Yuya Fujiwara, Yokohama (JP); Hiroshi Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 14/566,885

(22) Filed: Dec. 11, 2014

(65) Prior Publication Data

US 2015/0168816 A1 Jun. 18, 2015

(30) Foreign Application Priority Data

Dec. 16, 2013 (JP) .................................. 2013-259613
Dec. 16, 2013 (JP) .................................. 2013-259614

(51) Int. Cl.
| | |
|---|---|
| *H04N 5/232* | (2006.01) |
| *G03B 17/56* | (2006.01) |
| *G03B 17/02* | (2006.01) |
| *H04N 5/225* | (2006.01) |

(52) U.S. Cl.
CPC ............ *G03B 17/563* (2013.01); *G03B 17/02* (2013.01); *G03B 17/561* (2013.01); *H04N 5/2251* (2013.01); *H04N 5/23209* (2013.01); *H04N 5/23296* (2013.01)

(58) Field of Classification Search
CPC .. G03B 17/02; G03B 17/563; G03B 17/561; H04N 5/2251; H04N 5/23209; H04N 5/23296
See application file for complete search history.

(56) References Cited

U.S. PATENT DOCUMENTS

| | | | | |
|---|---|---|---|---|
| 3,974,513 A | * | 8/1976 | Waaske ................ | G03B 17/566 396/155 |
| 4,329,041 A | * | 5/1982 | Madge ................. | G03B 17/563 396/425 |
| 5,177,517 A | * | 1/1993 | Schappler .............. | G03B 17/04 348/E5.025 |
| 6,873,367 B1 | | 3/2005 | Hirata et al. | |
| 8,306,416 B2 | | 11/2012 | Yasuda | |

FOREIGN PATENT DOCUMENTS

| | | |
|---|---|---|
| JP | 2000-350073 A | 12/2000 |
| JP | 2011-065147 A | 3/2011 |

* cited by examiner

*Primary Examiner* — Dennis Hogue
(74) *Attorney, Agent, or Firm* — Fitzpatrick, Cella, Harper & Scinto

(57) ABSTRACT

An image pickup apparatus where a grip mounting portion to detachably mount a grip is formed, the image pickup apparatus includes a locking member configured to move between a locking position where the grip attached to the grip mounting portion is locked and a release position where locking to the grip is released, and a holding member partially arranged in a projection surface of the grip mounting portion and configured to engage with the locking member so as to hold the locking member at the release position. Mounting the grip to the grip mounting portion releases engagement between the holding member and the locking member so that the locking member moves from the release position to the locking position.

9 Claims, 22 Drawing Sheets

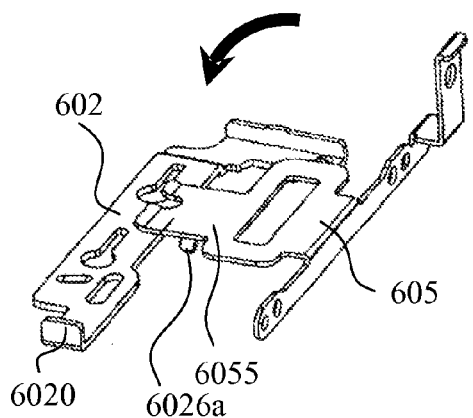
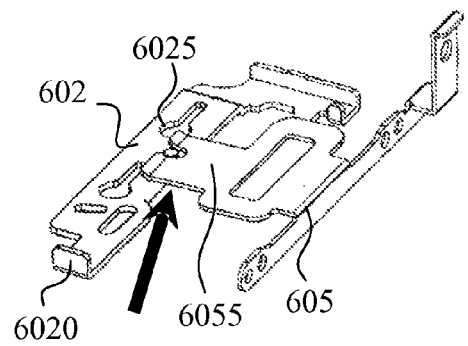
FIG. 11A          FIG. 11B
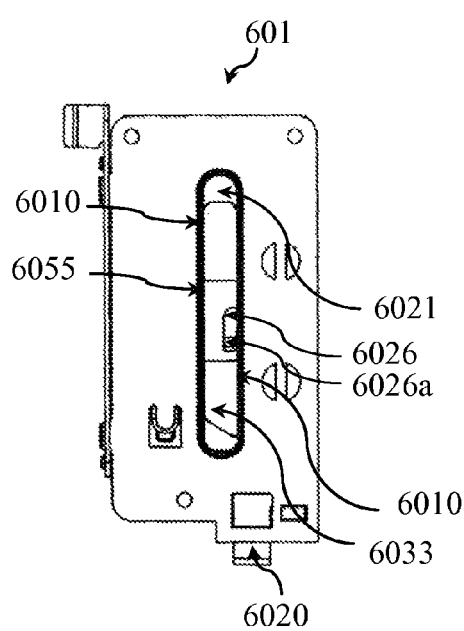
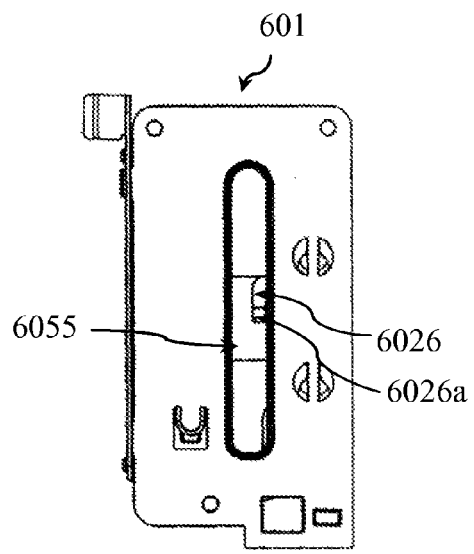
FIG. 12A          FIG. 12B

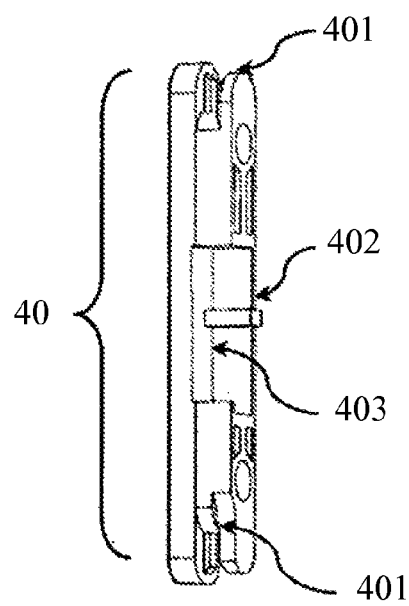 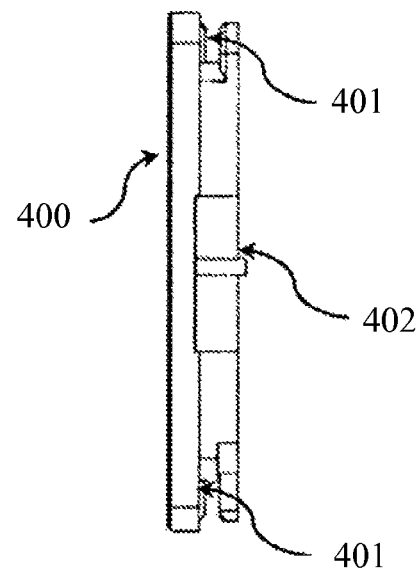
FIG. 13A          FIG. 13B
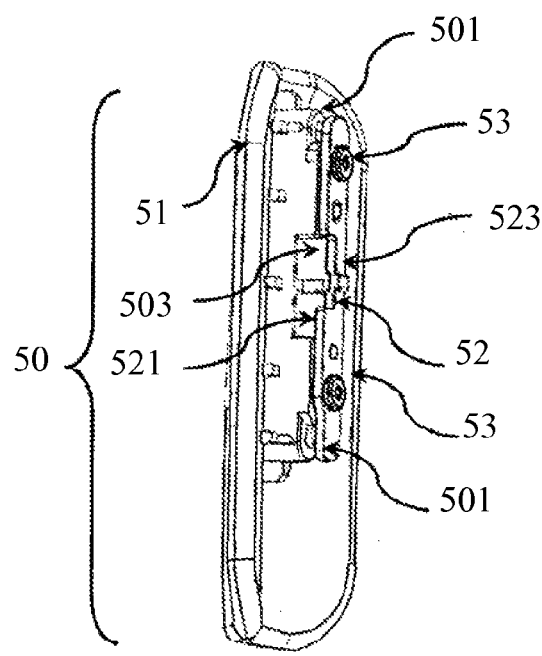 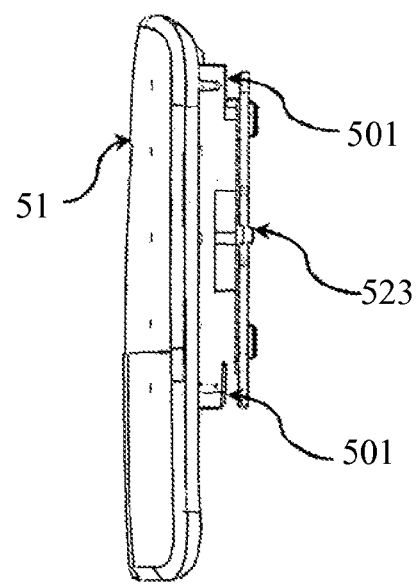
FIG. 14A          FIG. 14B

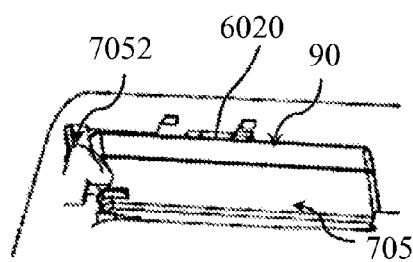
FIG. 17A
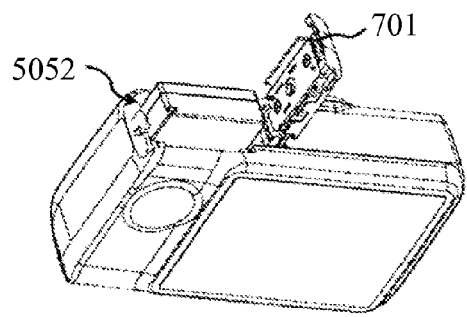 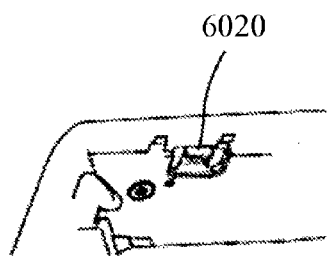
FIG. 17B     FIG. 17C
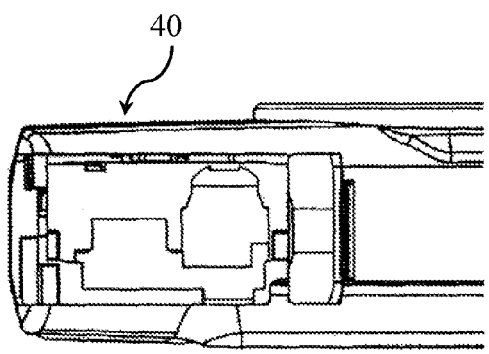
FIG. 18A
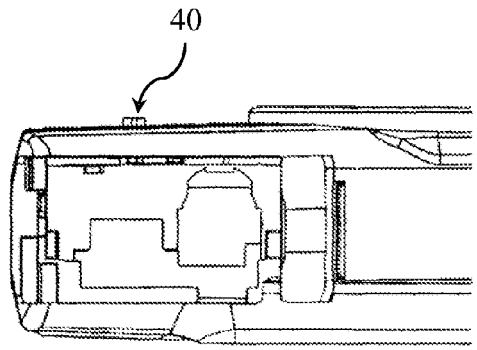
FIG. 18B

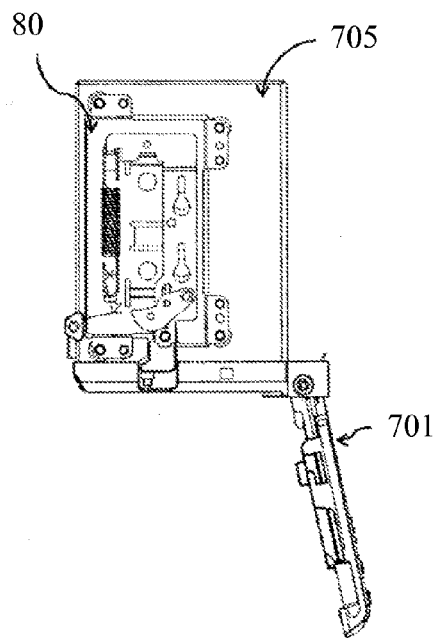 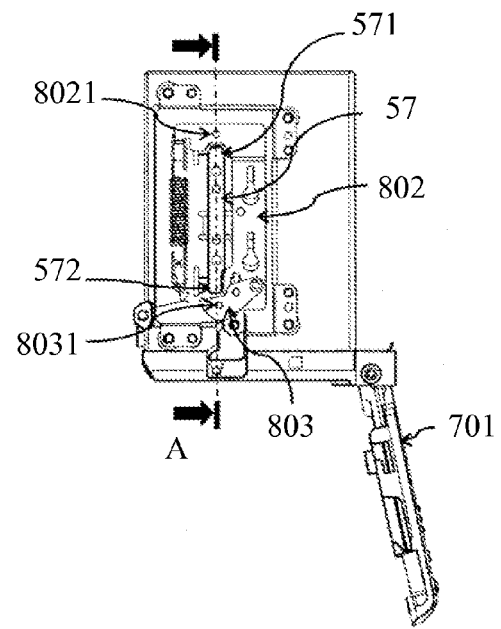
FIG. 28A          FIG. 28B
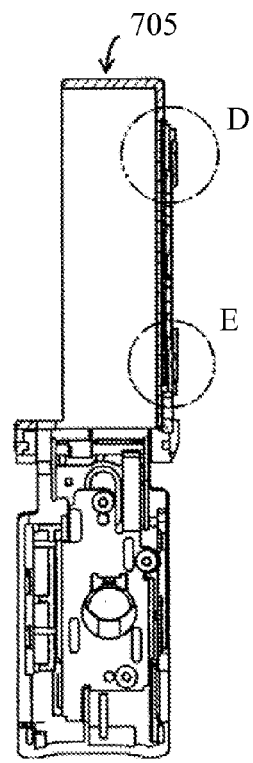
FIG. 28C

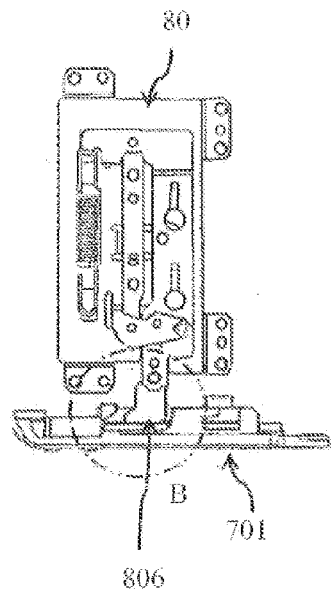
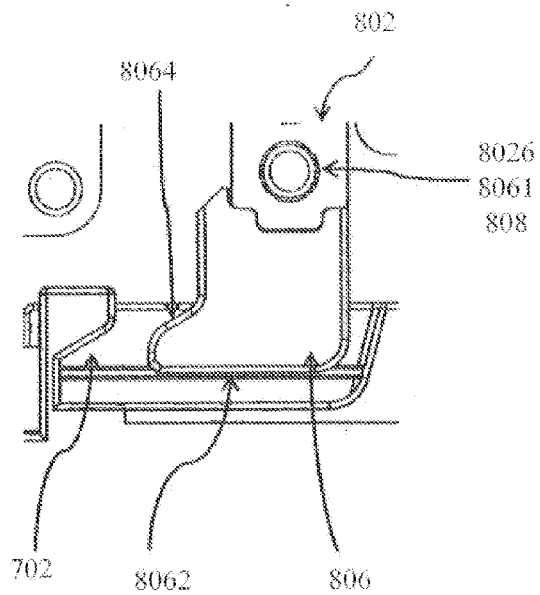
FIG. 30A  FIG. 30B
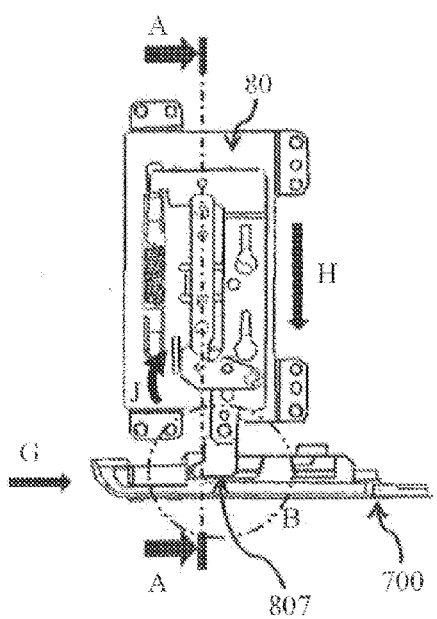
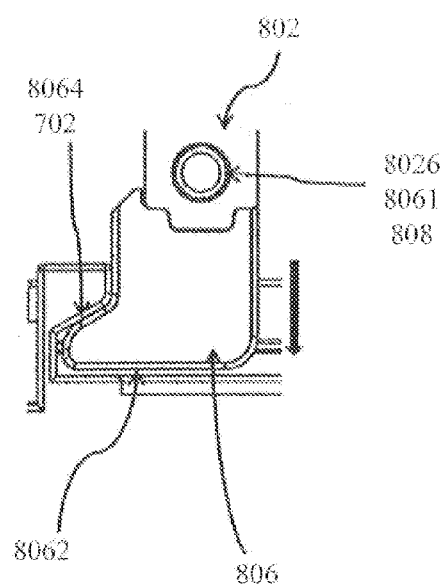
FIG. 31A  FIG. 31B

IMAGE PICKUP APPARATUS WITH MOVABLE LOCKING MEMBER

BACKGROUND OF THE INVENTION

1. Field of the Invention

The invention relates to an image pickup apparatus and grip thereof.

2. Description of the Related Art

A single lens reflex camera includes a movable mirror, shutter apparatus, and an image pickup sensor in an optical axis. Additionally, the single lens reflex camera selectively mounts a lens according to an object of image pickup.

Thinning a camera body in an optical axis direction is difficult since the above configuration arranges a mirror box between a lens mount and the shutter apparatus. As illustrated in Japanese Patent Laid-Open No. 2011-65147, rejection of a finder and a mirror box diffuses a mirror less type single lens reflex camera specialized miniaturization.

However, the single lens reflex camera disclosed in Japanese Patent Laid-Open No. 2011-65147 need to sacrifice either grip performance when attaching a large lens or miniaturization instead of a large grip so as to ensure fully grip performance when attaching the large lens. In other words, a small grip achieves miniaturization, but grasping performance degrades when attaching the large lens. Meanwhile, a large grip makes the camera body grow in size.

A grip adapter detachably attached by tightening a screw screwed into a tripod attaching screw portion provided on a bottom of a camera has been proposed (Japanese Patent Laid-Open No. 2000-350073). The grip adapter strengthens the finger hook to a convex shape of a grip when attaching a large lens so as to improve grasping performance.

In Japanese Patent Laid-Open No. 2000-350073, a tip of the grip apart from the tripod attaching screw portion is not fixed. The user may feel uneasy about grasping of the grip since the fixing to the tip of the grip is not sufficient. Additionally, detachable operability is bad because a tool for tightening the screw screwed into the tripod attaching screw portion is needed. Rotational operation of a screw head by hand without using the tool to tighten and loosen the screw necessitates a larger screw head. Large screw heads prevent miniaturization. Additionally, an unnecessary shape for grasping makes an attachment portion larger since a base portion of the grip adaptor is provided on the bottom of the camera body.

SUMMARY OF THE INVENTION

In view of the foregoing, the invention provides an image pickup camera including a grip detachable mechanism being stably attachable to a camera body, having an optimum grasping characteristic, and not blocking miniaturization of the camera body.

An image pickup apparatus as one aspect of the invention includes a grip mounting portion to detachably mount a grip. The image pickup apparatus comprises a locking member configured to move between a locking position where the grip attached to the grip mounting portion is locked and a release position where locking to the grip is released, and a holding member partially arranged in a projection surface of the grip mounting portion and configured to engage with the locking member to hold the locking member at the release position. Mounting the grip to the grip mounting portion releases engagement between the holding member and the locking member so that the locking member moves from the release position to the locking position.

An image pickup apparatus as another aspect of the invention includes a grip mounting portion to detachably mount a grip having an engaged portion. The image pickup apparatus comprises a moving member including an engaging portion for engaging with the engaged portion and configured to move to a first position where the engaging portion is not engaged with the engaged portion, to a second position where the engaging portion engages with the engaged portion and at which there is a gap between the grip and the image pickup apparatus, and to a third position where the engaging portion engages with the engaged portion and the gap is smaller than that at the second position, a holding member partially arranged in a projection surface of the grip mounting portion and configured to engage with the moving member to hold the moving member at the first position, and a urging member configured to urge the moving member toward the third position. Attachment of the grip with the grip mounting portion releases engagement between the holding member and the moving member so that the moving member moves from the first position to the second position by an urging force of the urging member, and subsequently moves the moving member from the second position to the third position.

Further features of the invention will become apparent from the following description of exemplary embodiments (with reference to the attached drawings).

BRIEF DESCRIPTION OF THE DRAWINGS

FIGS. 11A and 11B are perspective views of a substantial part of the grip mounting unit relating the embodiment 1.

FIGS. 12A and 12B are schematic diagrams of the grip mounting unit relating the embodiment 1 seen from a front side of the image pickup apparatus body.

FIGS. 13A and 13B are schematic diagrams illustrating a small size grip.

FIGS. 14A and 14B are schematic diagrams illustrating a large size grip.

FIGS. 17A to 17C are schematic diagrams illustrating grip detachment operation.

FIGS. 18A and 18B are bottom views of the image pickup apparatus body when detaching the grip.

FIGS. 28A to 28E are schematic diagrams illustrating a first state of the grip mounting unit relating to the embodiment 2.

FIGS. 30A and 30B are schematic diagrams illustrating a second state of the grip mounting unit relating to the embodiment 2.

FIGS. 31A to 31F are schematic diagrams illustrating a third state of the grip mounting unit relating to the embodiment 2.

DESCRIPTION OF THE PREFERRED EMBODIMENTS

Figure 1:
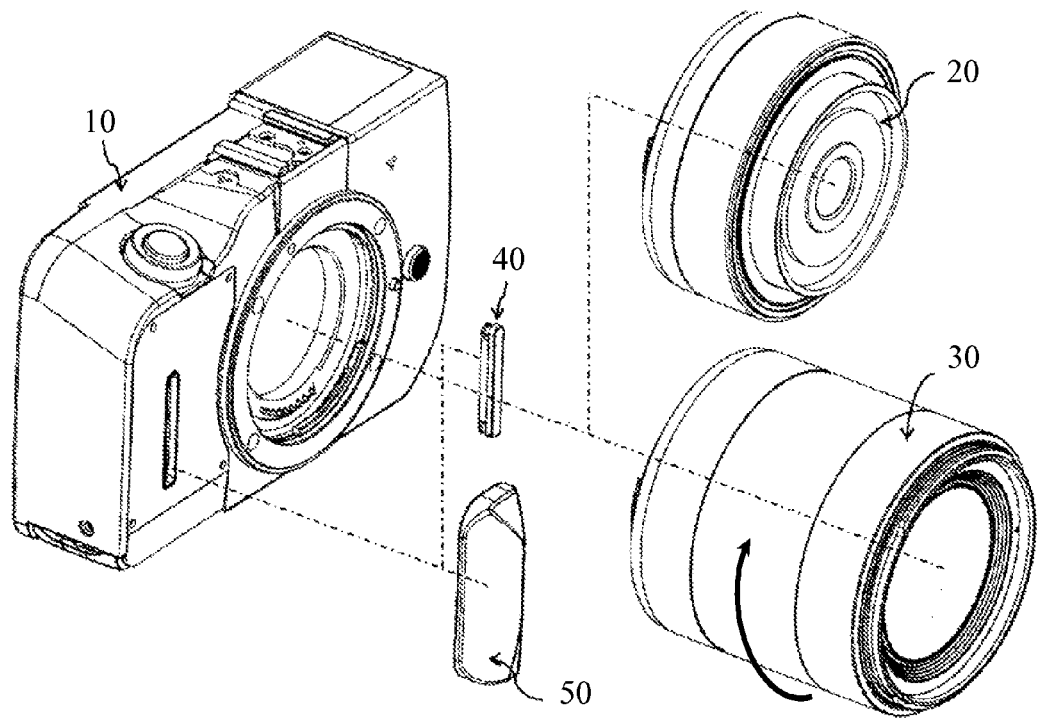
FIG. 1 is a schematic diagram illustrating an image pickup apparatus body according to an embodiment of the invention.

Exemplary embodiments of the invention will be described below with reference to the accompanied drawings. In each of the drawings, the same elements will be denoted by the same reference numerals and the duplicate descriptions thereof will be omitted.

FIG. 1 is a schematic diagram illustrating an image pickup apparatus body according to an embodiment of the invention, and a lens and a grip detachably attached to the image pickup apparatus body.

In this embodiment, a small size single focus lens 20 and a large size zoom lens 30 are selectively attached to an image pickup apparatus body 10. Additionally, a small size grip 40 and a large size grip 50 larger than the grip 40 are selectively attached to the image pickup apparatus body 10 by a grip mounting portion described below according to a size of lenses to provide optimum grip characteristic.

Figure 2A:
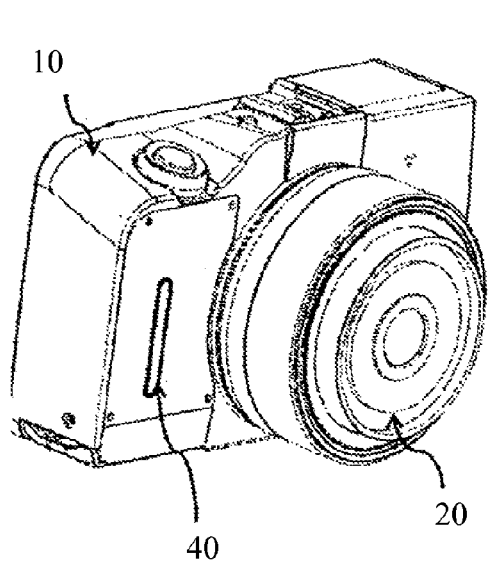
FIGS. 2A and 2B are schematic diagrams illustrating the image pickup apparatus body attached to a grip and a lens.
Figure 2B:
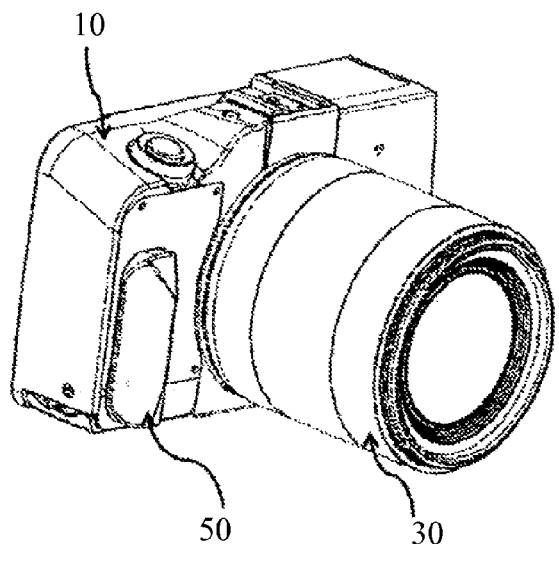

FIGS. 2A and 2B are schematic diagrams illustrating the image pickup apparatus body 10 attached to a grip and a lens. FIG. 2A is a schematic diagram illustrating the image pickup apparatus body 10 attached to the small size grip 40 according to the small size single focus lens 20. FIG. 2B is a schematic diagram illustrating the image pickup apparatus body 10 attached to the large size grip 50 according to the large size zoom lens 30.

Attachment and detachment means of a grip and a lens relating to this embodiment is explained in detail.

Figure 3:
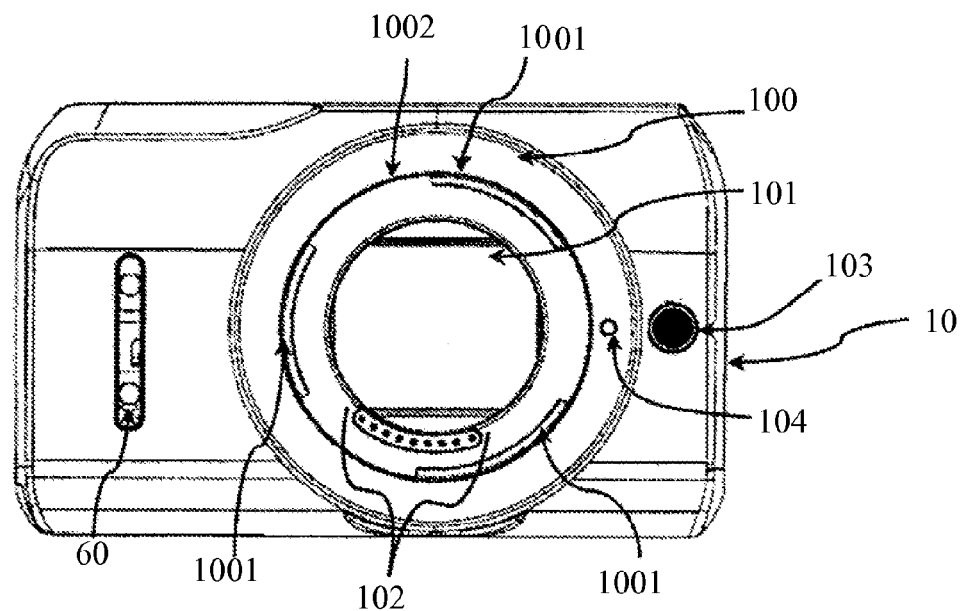
FIG. 3 is a front view of the image pickup apparatus body.
Figure 4:
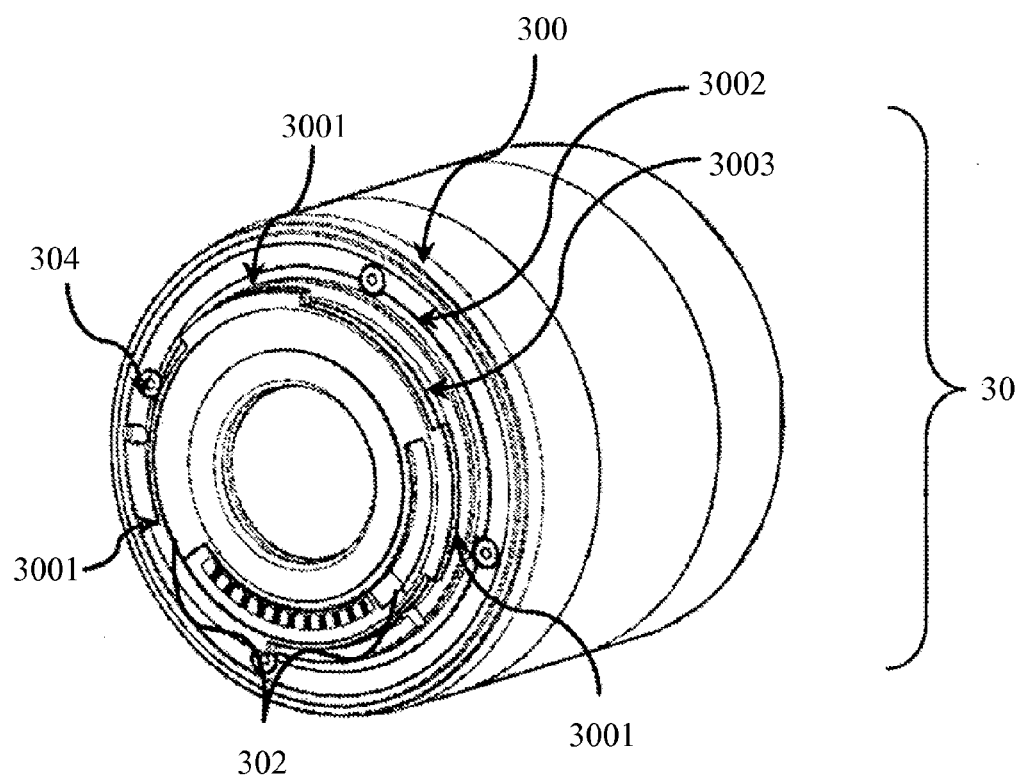
FIG. 4 is a perspective view of the lens seen from a back side.

First, a configuration of an image pickup apparatus body and a lens is explained. FIG. 3 is a front view of the image pickup apparatus body 10 not attached to a lens and a grip. FIG. 4 is a perspective view of the zoom lens 30 seen from a back side.

The image pickup apparatus body 10 includes a mount 100 being a lens mount surface, an image pickup sensor 101, a control substrate mounting a signal processing circuit, and a contact pin 102 for a lens electrically connected to the control substrate.

A hole 1002 is formed in a center of the doughnut shaped mount 100, and three convex body claw portions 1001 are provided at equal intervals inside the mount 100.

A lens release button 103 is provided near the mount 100. A lens locking pin 104 reciprocating from a surface of the mount 100 in conjunction with an operation of the lens release button 103 is provided on the mount 100. The lens release button 103 and the lens locking pin 104 are always urged to a front side of the paper by a spring (not illustrated). In other words, the lens locking pin 104 becomes convex from the surface of the mount 100 in FIG. 3.

The zoom lens 30 includes a terminal 302 electrically connected to a control substrate (not illustrated) inside a lens, and a lens mount 300.

The lens mount 300 is formed so that a center side becomes convex relative to a circumference, and includes a first cylinder portion 3002 whose diameter is corresponding to the hole 1002 formed on the mount 100. The first cylinder portion 3002 includes a second cylinder portion 3003. A hole 304 for engaging with the lens locking pin 104 is formed around the lens mount 300.

A lens claw portion 3001 is arranged at equal intervals to project from an outer periphery of the second cylinder portion 3003 to an exterior. A gap between adjacent lens claw portions 3001 is formed to be slightly wider than a width between the body claw portions 1001 provided on the mount 100. A distance from a lens mount surface to a back side of the lens claw portion 3001 along an optical axis is slightly wider than a diameter from a body mount surface to a back side of the body claw portions 1001.

Next, a lens attachment method to the image pickup apparatus body 10 is explained. In this embodiment, the lens is attached to the image pickup apparatus by one operation using a bayonet system with the mount 100 and the lens mount 300.

In other words, the second cylinder portion 3003 is inserted into the hole 1002 formed on the mount 100 so that the lens claw portion 3001 is inserted into a gap formed on the body claw portions 1001 of the mount 100. Then, the lens mount 300 pushes the lens locking pin 104 to the surface of the mount 100 so that the lens mount adheres to the lens mount 300.

After, when the zoom lens 30 rotates in an arrow direction in FIG. 1, the lens claw portion 3001 gets under a back side of the body claw portion 1001. Therefore, moving of the zoom lens 30 along the optical axis is restricted.

When the zoom lens 30 further rotates, the lens locking pin 104 falls into the hole 304 formed on the lens mount 300 so as to restrict rotation of the zoom lens 30. Then, attachment of the lens finishes.

At the same time, when the contact pin 102 of the image pickup apparatus body 10 connects to the terminal 302 of the zoom lens 30, the image pickup apparatus body 10 is electrically connected to the zoom lens 30. Therefore, a driving signal from the image pickup apparatus body 10 and information from the zoom lens 30 can be communicated between the image pickup apparatus body 10 and the zoom lens 30.

Subsequently, a lens detachment method is explained. In this embodiment, the lens is detached from the image pickup apparatus body 10 by two operations, pressing of the lens release button 103 and rotation of the lens.

In other words, the lens release button 103 is pressed from the state depicted in FIG. 2 attaching the lens. The lens locking pin 104 is pushed down to the mount surface in conjunction with pressing of the release button 103. Therefore, the lens locking pin 104 slips out the hole 304 formed on the lens mount 300 so as to rotate the zoom lens 30.

When the zoom lens 30 rotates in a counterclockwise direction in a state where the lens release button 103 is pressed, electrical connection between the contact pin 102 of the image pickup apparatus body 10 and the terminal 302 of the zoom lens 30 is released.

When the zoom lens further rotates from this state, the lens claw portion 3001 is positioned at a gap where the body claw portion 1001 is not present so that moving of the zoom lens 30 is not restricted. Therefore, detachment of the zoom lens 30 is performed.

In this embodiment, a lens is easily attached by one operation using a bayonet system. Moreover, a lens is detached by two operations so as to not be detached by unintended operation.

Attachment and detachment operations of the zoom lens 30 are explained, but the same attachment and detachment operations is applied to the single focus lens 20.

Next, attachment and detachment means of the grip are explained. First, a configuration of the image pickup apparatus body 10 and the grip relating to the attachment and detachment means is explained.

Figures 5A, 5B:
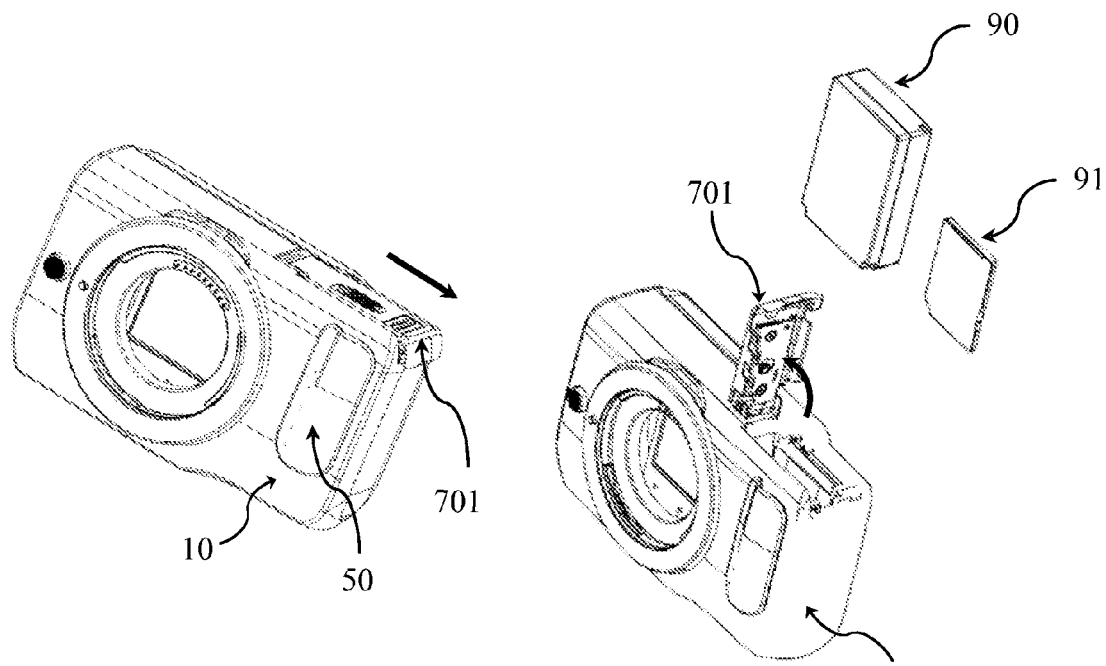
FIGS. 5A and 5B are perspective views of the image pickup apparatus body seen from a bottom side.
Figure 6:
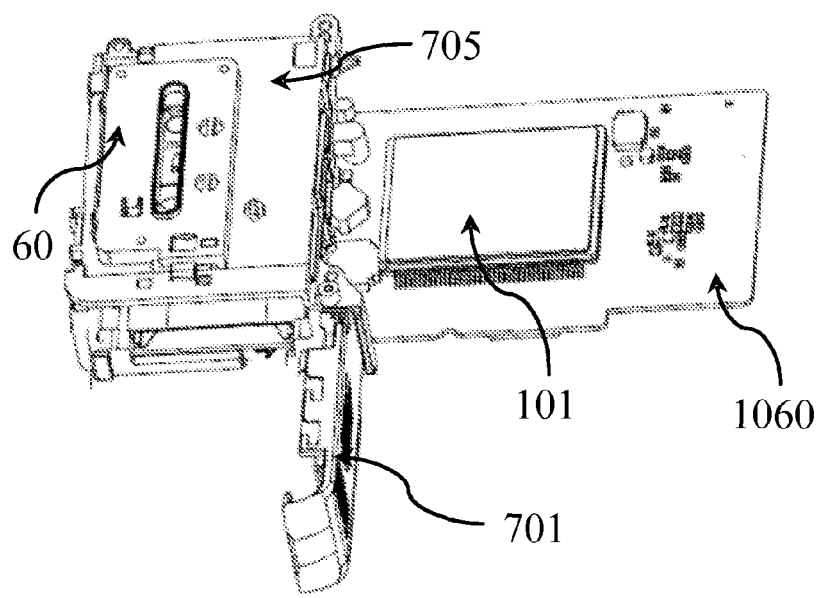
FIG. 6 is a perspective view illustrating an inside of a substantial part of the image pickup apparatus body.
Figure 7:
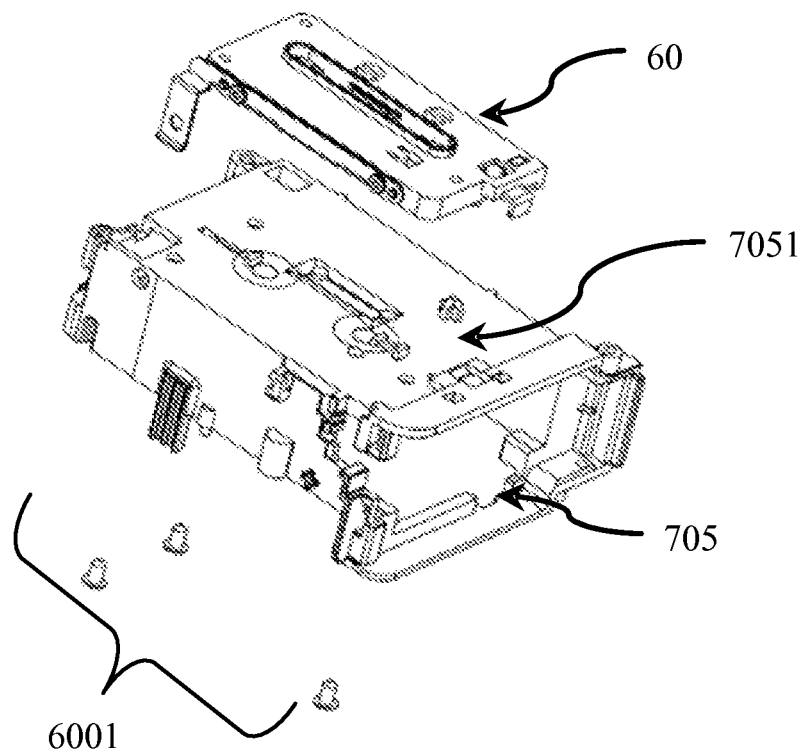
FIG. 7 is an exploded perspective view illustrating the inside of the substantial part of the image pickup apparatus body.

FIGS. 5A and 5B are perspective views of the image pickup apparatus body 10 seen from a bottom side. FIG. 6 is a perspective view illustrating an inside of a substantial part of the image pickup apparatus body 10. FIG. 7 is an exploded perspective view illustrating the inside of the substantial part of the image pickup apparatus body 10.

A lid (battery lid) 701 rotates in an arrow direction in FIG. 5B after sliding in an arrow direction in FIG. 5A, and then becomes an open state. When the lid 701 becomes the open state, a battery 90 supplying the image pickup apparatus body 10 with a power and a recording medium 91 recording an image pickup image can be inserted into the lid 701.

A battery housing 705 houses the battery 90 and the recording medium 91, and is fixed to the image pickup apparatus body 10. A control substrate 1060 includes an image pickup sensor 101 and connectors (not illustrated) electrically connecting the battery 90 and the recording medium 91 to the control substrate 1060.

As illustrated in FIG. 7, a grip mounting unit 60 is fastened on to an upper surface 7051 of a battery housing 705 by fixed screws 6001.

Example 1

Figure 8:
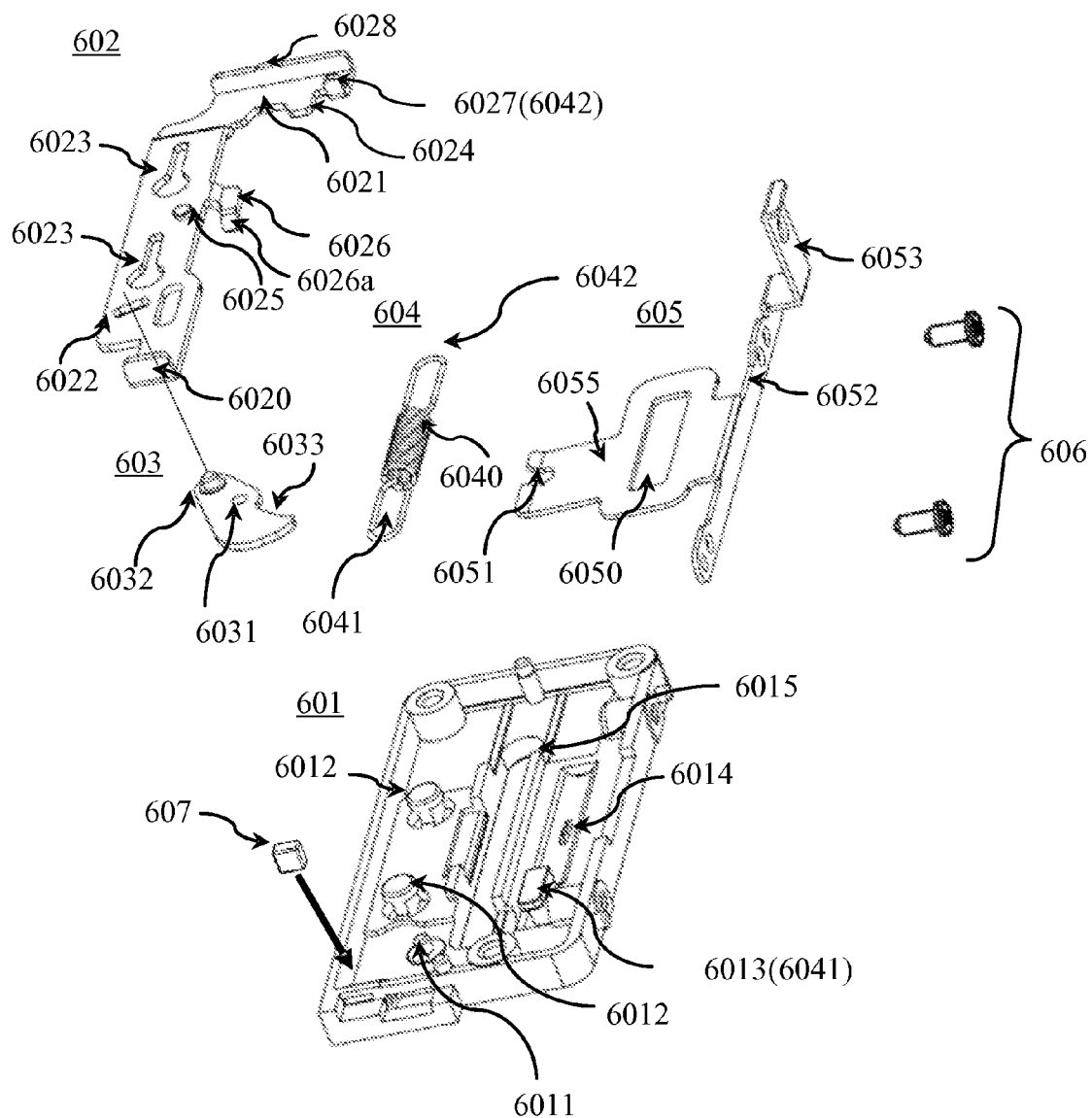
FIG. 8 is an exploded perspective view of a grip mounting unit relating the embodiment 1.
Figures 9A, 9B:
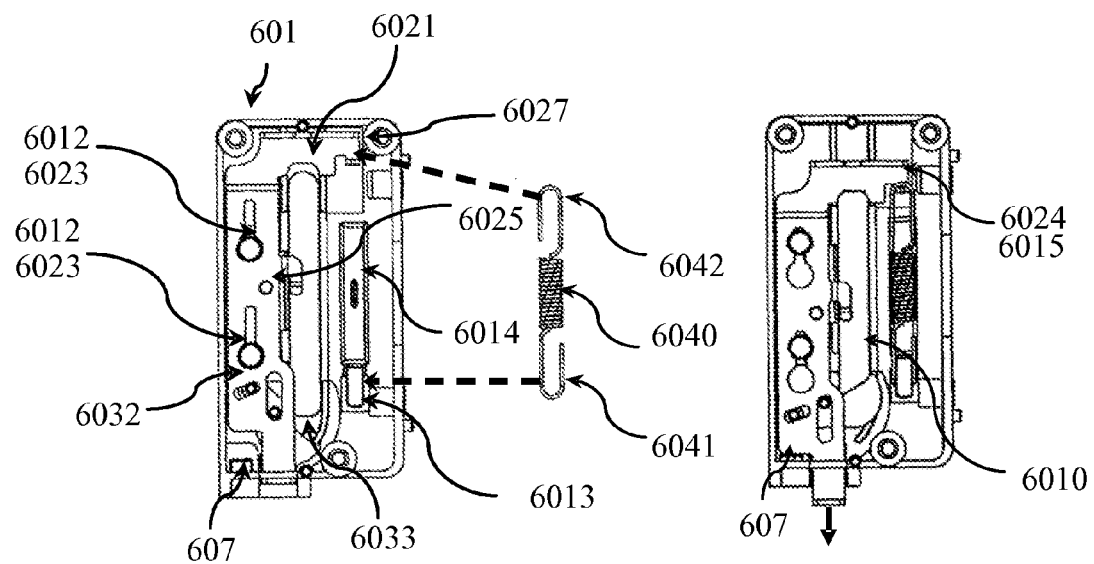
FIGS. 9A and 9B are schematic diagrams illustrating the grip mounting unit relating the embodiment 1 seen from a battery housing side.

A configuration of the grip mounting unit 60 relating this example is explained in detail using FIGS. 8, 9A and 9B. FIG. 8 is an exploded perspective view of the grip mounting unit 60. FIGS. 9A and 9B are schematic diagrams illustrating the grip mounting unit 60 seen from a battery housing 705 side. FIG. 9A illustrates a state that a first locking lever 602 and a second locking lever 603 are incorporated in a base 601. FIG. 9B illustrates a state that a coil spring 604 is incorporated in the grip mounting unit 60.

The grip mounting unit 60 includes the base 601, the first locking lever 602, the second locking lever 603, the coil spring 604, a leaf spring 605, a fixed screw 606, and a damper 607.

The base 601 is formed in box shape using synthetic resin material. The base 601 includes an axis 6011 being a rotational center of the second locking lever 603, a T-shaped boss 6012 coupled a large diameter portion and a small diameter portion, and a hooking portion 6013.

The first locking lever 602 is approximately formed in L-shape using the metal material. The first locking lever 602 includes an operation portion 6020, a long hole 6022 engaging with the second locking lever 603, a key hole 6023 coupled a large diameter hole with a small diameter long hole, an engagement projection 6025, and an arm portion 6026. The first locking lever 602 also includes a locking portion 6021, a stopper 6024, a hooking portion 6027, and a bending shape portion 6028. The large diameter hole of the key hole 6023 is formed so as to be slightly larger than an external diameter of the large diameter portion of the T-shaped boss 6012 of the base 601. A groove width of the small diameter long hole of the key hole 6023 is formed so as to be slightly larger the small diameter portion of the T-shaped boss 6012.

The second locking lever 603 is made of the metal material. The second locking lever 603 includes a hole 6031, an axis portion 6032, and a locking portion 6033. The first locking lever 602 and the second locking lever 603 serve as a locking member.

The coil spring 604 includes a coil spring portion 6040 having elasticity, and U-shaped first and second hooks 6041, 6042 provided on both sides so as to sandwich the coil spring portion 6040. The coil spring 604 serves as an urging member.

The damper 607 is an elastic body made of low rebound urethane foam.

In this embodiment, firstly, the damper 607 is assembled in the base 601. The damper 607 is pushed in a hole formed in the base 601, and is fixed to the hole by restoration force of the damper 607. Secondly, the axis 6011 provide on the base 601 is inserted into the hole 6031 formed on the second locking lever 603. The second locking lever 603 is thus rotatable around the axis 6011.

After attaching the second locking lever 603 to the base 601, as illustrated in FIG. 9A, the large diameter portion of the T-shaped boss 6012 is inserted into the large diameter hole of the key hole 6023 formed on the first locking lever 602. At the same time, the axis portion 6032 of the second locking lever 603 engages with a long hole 6022 of the first locking lever 602. The first locking lever 602 is thus attached to the base 601.

After attaching the first locking lever 602 to the base 601, the first hook 6041 of the coil spring 604 hooks the hooking portion 6013 of the base 601 so as to assemble the coil spring 604. After that, the second hook 6042 of the coil spring 604 hooks the hooking portion 6027 of the first locking lever 602. The coil spring 604 needs to extend from a natural length as illustrated in FIG. 9A so as to hook the hooking portion 6027 of the first locking lever 602.

Restoring force of the extended coil spring 604 moves the first locking lever 602 from the state depicted in FIG. 9A to the state depicted in FIG. 9B along an arrow direction in FIG. 9B. The second locking lever 603 then rotates from the state depicted in FIG. 9A to the state depicted in FIG. 9B. In the state depicted in FIG. 9B, the first locking lever 602 slightly pushes the damper 607, and the stopper 6024 of the first locking lever 602 abuts against a stopper 6015 of the base 601. In this embodiment, the first locking lever 602 abuts against the damper 607 before abutting against the stopper 6015 of the base 601 so as to cancel collision sound.

In this embodiment, the small diameter portion of the T-shaped boss 6012 of the base 601 engages with the small diameter long hole of the key hole 6023 of the first locking lever 602 so as to restrict a slide of the first locking lever 602. Additionally, in this embodiment, the first locking lever 602 is held on the base 601 in the state depicted in FIG. 9B without dropping out from the base 601 since the external diameter of the large diameter portion of the T-shaped boss 6012 of the base 601 is sufficiently larger than the small diameter long hole of the key hole 6023 of the first locking lever 602.

In this embodiment, a rib 6014 is formed on the base 601. A tip of the rib 6014 is a smooth convex shape. The coil spring 604 illustrated in FIG. 9B is attached to the base 601, and the rib 6014 then contacts with the coil spring portion 6040. Contacting the rib 6014 with the coil spring portion 6040 suppresses a fluttering sound generated by a collision between the base 601 and the coil spring portion 6040 when expanding the coil spring portion 6040.

Figures 10A, 10B:
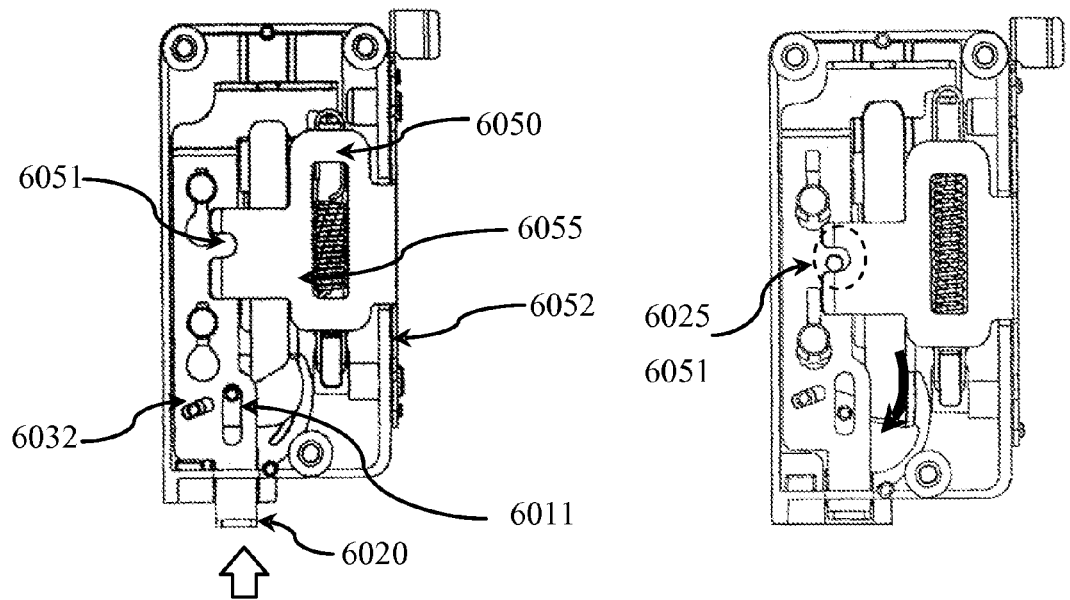
FIGS. 10A and 10B are schematic diagrams illustrating the grip mounting unit relating the embodiment 1 seen from a battery housing side.

FIGS. 10A and 10B are schematic diagrams illustrating the grip mounting unit 60 seen from a battery housing 705 side.

The leaf spring 605 is made of elastically deformable metal material, and as illustrated in FIG. 8a, a first end thereof is folded. An attaching portion 6052 includes a screw hole to attach to the base 601, and a fixing portion 6053 so as to attach the grip mounting unit 60 to the image pickup apparatus body 10. Therefore, a surface portion 6055 adjacent to the attaching portion 6052 is deformable relative to the attaching portion 6052. The leaf spring 605 serves as a holding member. The surface portion 6055 serves as a part arranged in a projection surface of the grip mounting portion.

As illustrated in FIG. 10A, a hole 6050 avoiding the coil spring portion 6040 of the coil spring 604 is formed on the leaf spring 605. Therefore, when the leaf spring 605 is attached to the base 601, the coil spring portion 6040 of the coil spring 604 is exposed from the hole 6050.

Here, as illustrated in FIG. 8, the first and second hooks 6041, 6042 of the coil spring 604 are formed in a plane passing through a center of a circle providing a coil diameter of the coil spring portion 6040. Therefore, when the coil spring portion 6040 is exposed from the hole 6050 of the leaf spring 605, the first and second hooks 6041, 6042 is respectively held on an upper side and a lower side of the hole 6050. Additionally, in this embodiment, when the leaf spring 605 is attached to the base 601, projection height of the hooking portion 6027 formed on the first locking lever 602 is higher than the leaf spring 605. Therefore, the second hook 6042 does not detach from the hooking portion 6027.

As illustrated in FIGS. 8, 10A, and 10B, a U-shaped cutout portion 6051 is provided at a tip of the leaf spring 605. The surface portion 6055 providing the cutout portion 6051 is bent at a sharp angle relative to the attaching portion 6052 so as to fix to the base 601. Therefore, the surface portion 6055 of the leaf spring 605 attached to the base 601 is urged to the first locking lever 602. In other words, the leaf spring 605 is urged to the first locking lever 602 in an arrow direction in FIG. 11A, and a back side of the surface portion 6055 of the leaf spring 605 abuts against a tip of the engagement projection 6025 formed on the first locking lever 602.

Subsequently, an operation of the grip mounting unit 60 is explained in detail.

As illustrated in FIG. 10A, the grip mounting unit 60 relating this embodiment moves the first locking lever 602 up and down. FIG. 10B illustrates a state that the first locking lever 602 is moved in an arrow direction in FIG. 10A.

When the user pushes the operation portion 6020 of the first locking lever 602 in the arrow direction in FIG. 10A from the state depicted in FIG. 10A, the first locking lever 602 moves in the arrow direction in FIG. 10A in a state that the engagement projection 6025 provided on the first locking lever 602 engages with the leaf spring 605.

When the first locking lever 602 moves so that the engagement projection 6025 of the first locking lever 602 overlaps the cutout portion 6051 of the leaf spring 605, the surface portion 6055 of the leaf spring 605 moves on a depth side of the paper in FIGS. 10A and 10B as described above by an urging force. In other words, the surface portion 6055 of the leaf spring 605 deforms in an arrow direction in FIG. 11A and becomes the state depicted in FIG. 11B. A corner of the cutout portion 6051 of the leaf spring 605 then engages with the engagement projection 6025 of the first locking lever 602, and the state depicted in FIG. 10B is kept. The axis portion 6032 of the second locking lever 603 inserted into the long hole 6022 of the first locking lever 602 also moves in the same direction. The second locking lever 603 then rotates around the axis 6011 in an arrow direction in FIG. 10B.

When the user pushes the operation portion 6020 of the first locking lever 602 in the state depicted in FIG. 10A, the state depicted in FIG. 10A changes to the state depicted in FIG. 10B, and the first locking lever 602 engages with the leaf spring 605. The first locking lever 602 is hold in the state depicted in FIG. 10B. At the same time, the surface portion 6055 of the leaf spring 605 moves by a height of the engagement projection 6025 provided on the first locking lever 602 in a depth direction of the paper.

When the surface portion 6055 of the leaf spring 605 moves on a front side of the paper in the state depicted in FIG. 10B, engagement between the first locking lever 602 and the leaf spring 605 is released. The first locking lever 602 moves in a down direction of the paper by the restoring force of the coil spring 604, and the state depicted in FIG. 10B changes to the state depicted in FIG. 10A.

In other words, when external power is applied in an arrow direction of FIG. 11B, the surface portion 6055 of the leaf spring 605 moves by the height of the engagement projection 6025 provided on the first locking lever 602 against restoring force of the leaf spring 605, and the state depicted in FIG. 11B changes to the state depicted in FIG. 11A.

FIGS. 12A and 12B are schematic diagrams of the grip mounting unit 60 seen from a front side of the image pickup apparatus body 10. FIGS. 12A and 12B illustrate the grip mounting unit 60 respectively seen from a side opposite to a side seen in FIG. 10A and seen from a side opposite to a side seen in FIG. 10B.

The base 601 includes an opening (grip mounting portion) 6010 removably inserted into the grip. When the grip mounting unit 60 becomes the state depicted in FIGS. 10A and 12A, the locking portion 6021 of the first locking lever 602 and the locking portion 6033 of the second locking lever 603 are exposed in a projection surface of the opening 6010. In this embodiment, this state is a close state of the grip mounting portion 60. In the close state of the grip mounting portion 60, the first locking lever 602 moves by the restoring force of the coil spring 604, and the surface portion 6055 of the leaf spring 605 overlaps the engagement projection 6025 of the first locking lever 602 so as to charge the surface portion 6055 of the leaf spring 605. When the grip mounting portion 60 becomes the close state, the first and second locking levers 602, 603 are positioned at an engagement position engaging with mounted grip.

Additionally, the grip mounting unit 60 becomes the state depicted in FIGS. 10B and 12B, the locking portion 6021 of the first locking lever 602 and the locking portion 6033 of the second locking lever 603 are evacuated from the projection surface of the opening 6010. This state is an open state of the grip mounting unit 60. In the open state of the grip mounting unit 60, the engagement projection 6025 provided on the first locking lever 602 engages with the cutout portion 6051 of the leaf spring 605, and the coil spring 604 is charged by being extended from a natural length. The grip mounting unit 60 becomes the open state, the first and second locking levers 602, 603 are positioned at a release position releasing engagement with mounted grip.

Next, the grip selectively mountable to the image pickup apparatus body 10 is explained in detail.

First, a configuration of the grip is explained. FIGS. 13A and 13B are schematic diagrams illustrating a small size grip 40. FIGS. 13A and 13B illustrate the grip 40 respectively seen from a back surface and a side surface. FIGS. 14A and 14B are schematic diagrams illustrating a large size grip 50. FIGS. 14A and 14B illustrate the large size grip 50 respectively seen from a back side and a side surface. The small grip 40 or the large grip 50 serves as a grip.

The small grip 40 includes an appearance portion 400, a groove 401 formed on both ends thereof, a concave shape 403 formed at a center on one side surface thereof, and a protruding portion 402 protruding from a bottom surface thereof.

The large grip 50 includes a grip portion 51 formed by resin material having a high friction coefficient, a metal plate 52, and a screw 53 fixing the grip portion 51 and the metal plate 52.

A groove 501 formed by the metal plate 52 and the grip portion 51 is provided at both ends of the large grip 50. A concave shape 503 of the grip portion and a protruding portion 521 formed on the metal plate 52 is further provided at a center of one side surface of the large grip 50. A protruding portion 523 is formed on the metal plate 52 by half blanking.

When different size grips are selectively attachable to the image pickup apparatus body, static pressure load applied in a direction peeling the grip is different according to a size of the grip. In this embodiment, a configuration of grooves 401, 501 is different. The groove 401 is integrally molded with the small grip 40 just applied to small static pressure load so as to reduce costs. The groove 501 of the large grip 50 is formed by two parts, which are the grip portion 51 and the metal plate 52, so as to tolerate large static pressure load.

For example, in the FIG. 2B, even if the large grip 50 is applied to a load in the peeling direction, the metal plate 52 can receive the static pressure load.

When different size grips are selectively attachable to the image pickup apparatus body, backlash amounts of a tip of the mounted grip are different according to a size of the grip. In this embodiment, the large grip 50 includes a mechanism for reducing backlash by the protruding portion 521.

The large grip 50 is combined by a plurality of materials, which are the grip portion 51 and the metal plate 52. For example, the grip portion 51 is formed by the material having high elasticity such as elastomer, and the grip portion 51 contacts to an appearance cover of the image pickup apparatus body 10 by elastic deformation when the large grip 50 is mounted to the image pickup apparatus body 10. Therefore, backlash amounts of the mounted grip become smaller.

Figure 15:
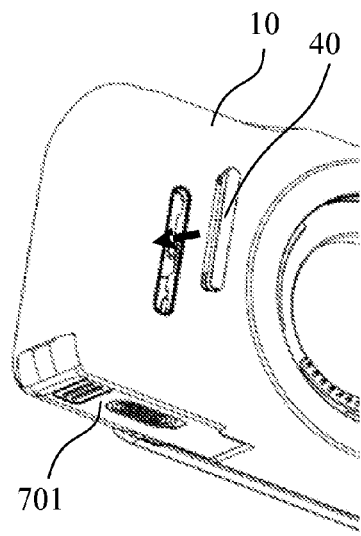
FIG. 15 is a schematic diagram illustrating a state that the small grip is being mounted to the image pickup apparatus body.
Figure 16:
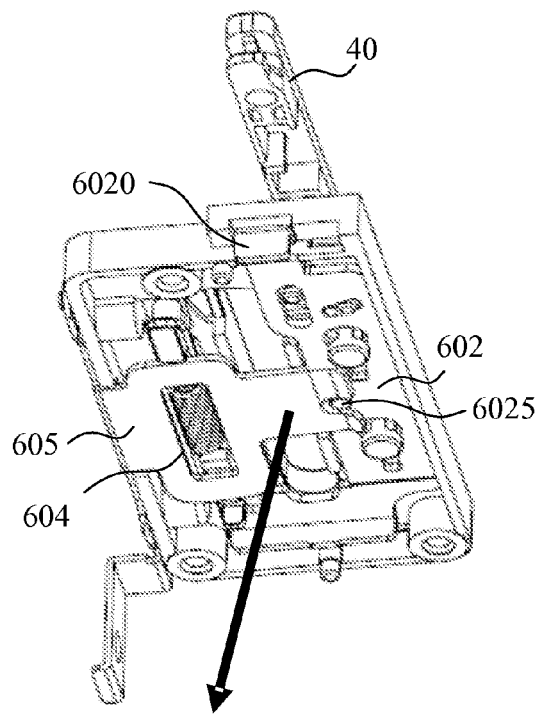
FIG. 16 is a schematic diagram illustrating a state that the small grip is being mounted to the grip mounting unit relating to the embodiment 1.

Next, an operation when attaching the grip to the image pickup apparatus body 10 is explained. FIG. 15 is a schematic diagram illustrating a state that the small grip 40 is being mounted to the image pickup apparatus body 10. FIG. 16 is a schematic diagram illustrating a state that the small grip 40 is being mounted to the grip mounting unit 60. The grip mounting unit 60 in FIGS. 15 and 16 are the open state.

Attaching the small grip 40 to the image pickup apparatus body 10 relating to this embodiment, as illustrated in FIGS. 15 and 16, is performed by inserting the small grip 40 into the opening 6010. In other words, the protruding portion 402 formed on the bottom surface of the small grip 40 abuts against the surface portion 6055 of the leaf spring 605 which is exposed from the opening 6010 by inserting the small grip 40 into the opening 6010 of the base 601. The surface portion 6055 of the leaf spring 605 is then pushed in an arrow direction in FIG. 16, and the engagement between the corner of the cutout portion 6051 of the leaf spring 605 and the engagement projection 6025 of the first locking lever 602 is released. When the engagement between the first locking lever 602 and the leaf spring 605 is released, the first locking lever 602 moves by the restoring force of the coil spring 604, and the grip mounting unit 60 enters the close state. When the grip mounting unit 60 is in the close state, the locking portions 6021, 6033 of the grip mounting unit 60 respectively engage with the groove 401 formed on the both ends of the small grip 40. Attaching the small grip 40 to the image pickup apparatus body 10 finishes the process.

When the small grip 40 is inserted into the opening 6010 in an intended state of the small grip 40 (e.g. a state inclined in an upper direction), either of the locking portions 6021, 6033 may engage with the groove 401 formed on the both ends of the small grip 40. In this embodiment, as illustrated in FIGS. 12A and 12B, the arm portion 6026 of the first locking lever 602 is overlapped with the surface portion 6055 of the leaf spring 605 so that the surface portion 6055 of the leaf spring 605 which is exposed from the opening 6010 becomes smaller. In other words, even if the small grip 40 is slidingly inserted, the grip mounting unit 60 does not enter the close state since the protruding portion 402 of the small grip 40 does not push the surface portion 6055 of the leaf spring 605.

Additionally, if the grip is inserted in a direction opposite to a vertical direction, grip performance may be not fully shown due to a shape of the grip. In this embodiment, the concave shape (restricting portion) 403 is formed on one side surface of the small grip 40. Therefore, even if the small grip 40 is inserted in a direction opposite to a vertical direction, the protruding portion 402 is interrupted by the arm portion 6026 of the first locking lever 602 and does not push the surface portion 6055 of the leaf spring 605. As a result, the grip mounting unit 60 does not enter the close state.

The same configuration is applied to the large grip 50.

In this embodiment, the large grip 50 includes the mechanism for reducing backlash. As illustrated in FIGS. 14A and 14B, the large grip 50 includes the protruding portion 521. Additionally, as illustrated in FIGS. 12A and 12B, a slope portion 6026a is formed on a tip of the arm portion 6026. The slope portion 6026a is formed by bending the tip of the arm portion 6026 on an opening 6010 side. In this embodiment, when the large grip 50 is attached, the slope portion 6026a formed on the tip of the arm portion 6026 of the first locking lever 602 enters into a back side of the protruding portion 521 of the large grip 50 before the locking portions 6021, 6033 engage with the groove 501. The large grip 50 is thus drawn in an image pickup apparatus body 10 side direction, i.e. a grip mounting direction which is a depth direction of the paper in FIG. 12. As a result, backlash when attaching the large grip 50 to the image pickup apparatus body 10 becomes smaller.

Next, grip detachment operation is explained. FIGS. 17A to 17C are schematic diagrams illustrating grip detachment operation.

In the grip detachment operation relating to this embodiment, first, the lid 701 is opened so as to expose the battery housing 705 as illustrated in FIG. 17A. The battery housing 705 includes a battery engagement claw 7052. The battery engagement claw 7052 moves between a battery engagement state for engaging with the battery 90 and a non-battery engagement state for not engaging with the battery 90 by user operation.

FIG. 17C is a state after making the battery engagement claw 7052 the non-battery engagement state by the user operation as illustrated in FIG. 17B, and removing the battery 90.

In the state depicted in FIG. 17C, the operation portion 6020 of the first locking lever 602 is exposed. In this state, when the user pushes the operation portion 6020, the grip becomes detachable.

The operation portion 6020 of the grip mounting unit 60 is arranged a position where the user cannot operate in a state that the battery 90 is inserted. In other words, a position of the operation portion 6020 is lower than an upper end of the battery 60 in the state that the battery 90 is inserted. Therefore, the grip is not detached carelessly since the user cannot contact the operation portion 6020 in the state that the battery 90 is inserted into the battery housing 705.

FIGS. 18A and 18B are bottom views of the image pickup apparatus body 10 when detaching the grip. FIG. 18A illustrates a state that the small grip 40 is attached to the image pickup apparatus body 10, and FIG. 18B illustrates a state that the operation portion 6020 is operated from the state depicted in FIG. 18A.

As illustrated in FIG. 18A, convex amounts of the grip 40 from a surface of the image pickup apparatus body 10 is illimitably small. Additionally, the leaf spring 605 of the grip mounting unit 60 moves so as to push the grip 40 by a detachment operation to transfer from the state depicted in FIG. 11B to the state depicted in FIG. 11A. Even the grip attached to the image pickup apparatus body 10 whose convex amounts from the image pickup apparatus body 10 are illimitably small is easily detachable from the image pickup apparatus body 10 since the grip 40 is lifted from the image pickup apparatus body 10 as illustrated in FIG. 18B. In other words, the grip is lifted by the height of the engagement projection 6025 provided on the locking portion 6021 in the grip detachment state, and thus, the user can grasp even the small grip 40.

In the grip mounting mechanism relating to this embodiment, the leaf spring 605 is displaced in the grip detachment direction so as to engage with the engagement projection 6025 provided on the locking portion 6021. Therefore, the locking portion 6021 of the first locking lever 602 engages with the locking portion 6033 of the second locking lever 603 in the open state that the grip mounting unit 60 evacuates from the opening 6010 (See FIGS. 12A and 12B). When the grip is inserted into the opening 6010 of the grip mounting unit 60, the engagement between the leaf spring 605 and the engagement projection 6025 is released so as to fix the grip to the image pickup apparatus body 10. When the grip is detached, the grip is pushed on the front side by displacing the leaf spring 605 in the grip detachment direction. The grip whose convex amounts are small and the grip cap which is formed at the same surface as the camera appearance surface are provided.

Additionally, the camera relating to this example is attachable by one action only inserting the grip into the opening. When the grip is detached, the grip is detachable by two operations pushing the operation portion 6020 after opening the lid 701 so as not to be detached by unintended operation.

As explained above, in this example, optimum grip size according to the lens is selectively detachable with the same labor as interchange of the lens. Therefore, the large grip is mountable when using the large lens and the small grip is mountable when using the small lens. In other words, a small image pickup apparatus having an optimum grasping performance is provided.

Example 2

A configuration of a grip mounting unit 80 relating to this example is explained using FIGS. 19A, 19B, 20A, and 20B.

Figure 19A:
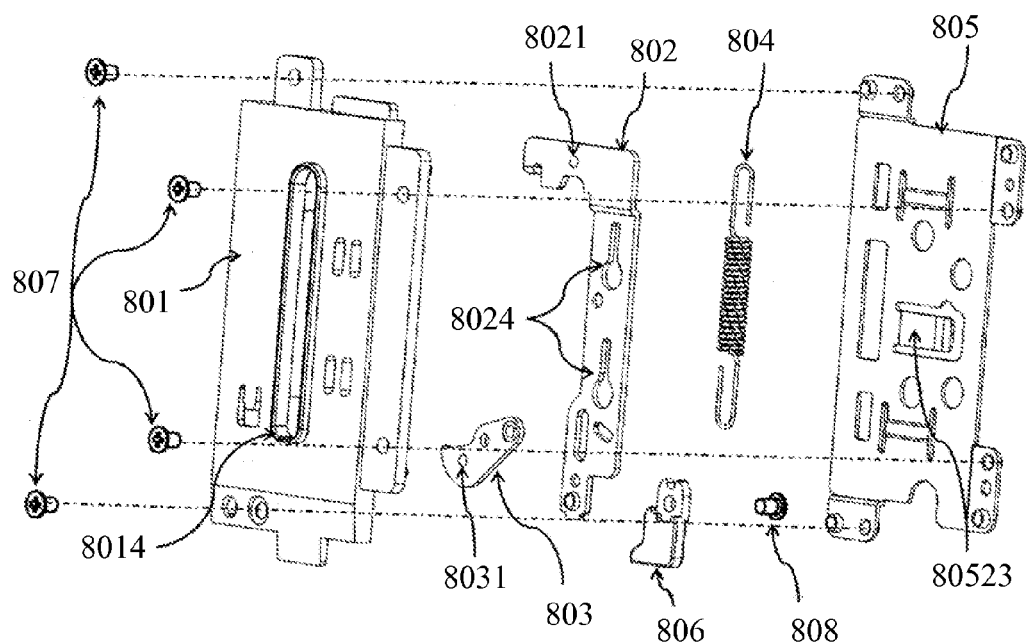
FIGS. 19A and 19B are exploded perspective views of a grip mounting unit relating to an embodiment 2.
Figure 19B:
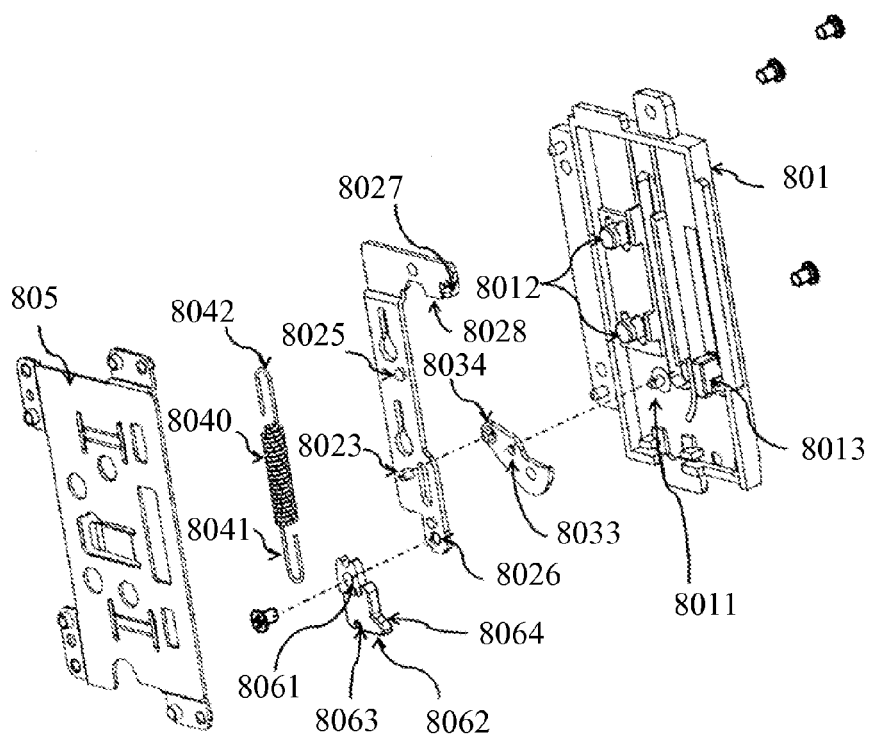

FIGS. 19A and 19B are exploded perspective views of the grip mounting unit 80. FIG. 19A illustrates the grip mounting unit 80 seen from a grip side, and FIG. 19B illustrates the grip mounting unit 80 seen from a battery housing side.

The grip mounting unit 80 includes a base 801, a first moving member 802, a second moving member 803, an urging member 804, a holding member 805, an operation member 806, and fixing screws 807, 808.

The base 801 is formed in box shape using synthetic resin material. The base 801 includes an axis 8011, a T-shaped boss 8012 coupled a large diameter portion with a small diameter portion, and a hooking claw 8013.

The first moving member 802 includes a first engaging portion 8021, an engagement projection 8025, a hooking portion 8027, and a stopper 8028. The first moving member 802 also includes a long hole 8023, a key hole 8024 coupled a large diameter hole with a small diameter long hole, and a screw hole 8026. The large diameter hole of the key hole 8024 is formed so as to be larger than an external diameter of the large diameter portion of the T-shaped boss 8012 of the base 801. A groove width of the small diameter long hole of the key hole 8024 is formed so as to be larger the small diameter portion of the T-shaped boss 8012.

The second moving member 803 includes a second engaging portion 8031, an axis portion 8034, and a hole 8033.

The urging member 804 includes a coil spring portion 8040 having elasticity, and U-shaped first and second hooks 8041, 8042 provided on both sides so as to sandwich the coil spring portion 8040.

The operation member 806 includes a hole 8061 for fixing to the screw hole 8026 formed on the first moving member 802 by the screw. The operation member 806 also a first operation portion 8062 for operating by the finger, a second operation portion 8063 for operating by the pen tip, and a second abutting portion 8064 abutting against a first abutting portion 702 of a lid 701 described below.

Figures 20A, 20B:
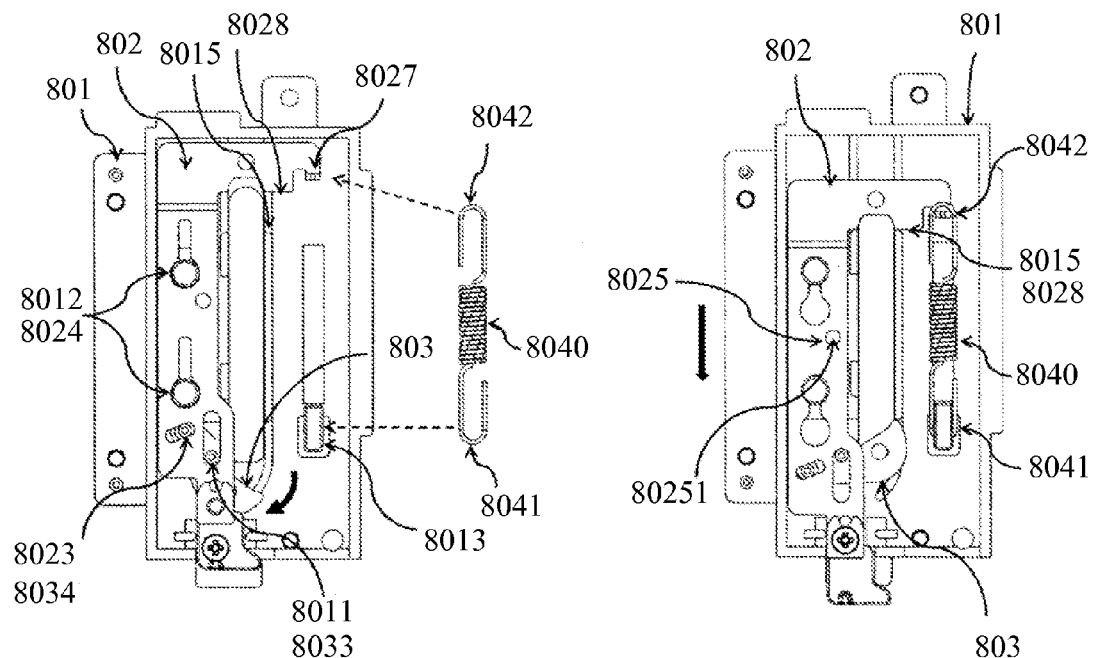
FIGS. 20A and 20B are schematic diagrams illustrating the grip mounting unit relating to the embodiment 2.

FIGS. 20A and 20B are schematic diagrams illustrating the grip mounting unit 80 seen from a battery housing 705 side. FIG. 20A illustrates a state that the first moving member 802 and the second moving member 803 are incorporated in the base 801. FIG. 20B illustrates a state that the urging member 804 is incorporated in the grip mounting unit 80.

When the axis 8011 provided on the base 801 is inserted into the hole 8033 formed on the second moving member 803, the second moving member 803 is rotatable around the axis 8011.

The large diameter portion of the T-shaped boss 8012 formed on the base 801 is inserted into the large diameter hole of the key hole 8024 formed on the first moving member 802. Additionally, the axis portion 8034 of the second moving member 803 is inserted into the long hole 8023 formed on the first moving member 802.

Restoring force of the extended coil spring portion 8040 moves the first and second moving members 802, 803 from the state depicted in FIG. 20A to the state depicted in FIG. 20B. In other words, the moving member 802 moves in an arrow direction of FIG. 20B until a stopper 8028 of the first moving member 802 abuts against a stopper 8015 of the base 801.

In this embodiment, the small diameter portion of the T-shaped boss 8012 of the base 801 engages with the small diameter long hole of the key hole 8024 of the first moving member 802 so as to restrict a slide of the first moving member 802. Additionally, in this embodiment, the first moving member 802 is held on the base 801 in the state depicted in FIG. 20B without dropping out from the base 801 since the external diameter of the large diameter portion of the T-shaped boss 8012 is sufficiently larger than the small diameter long hole of the key hole 8024.

Figure 21:
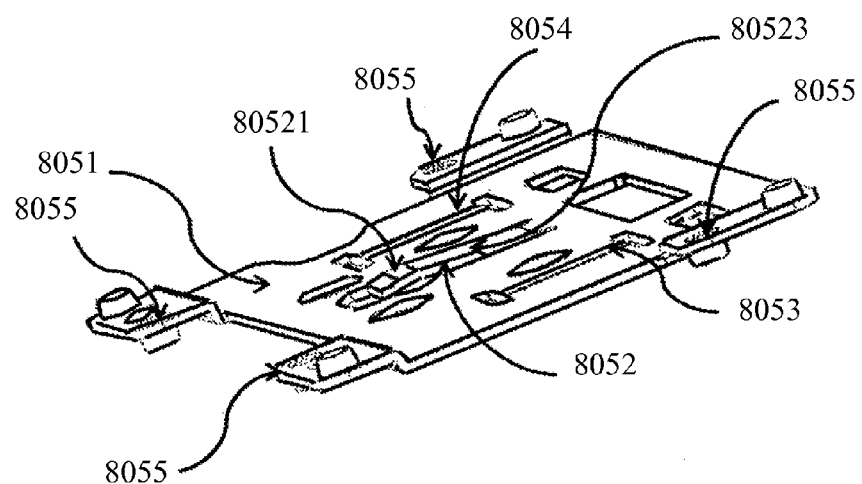
FIG. 21 is a perspective view of a holding member.

FIG. 21 is a perspective view of the holding member 805. The holding member 805 is made of the metal material having elasticity. The holding member 805 includes a restricting portion 8052 obliquely bent toward a base 801 side relative to a body surface 8051. The holding member 805 also includes a first grip urging portion 8053 and a second grip urging portion 8054, which urge the grip so as to push on the outside of the camera body when inserting the grip. The holding member 805 further includes a screw 8055 for fixing the base 801 by the screw.

Figures 22A, 22B:
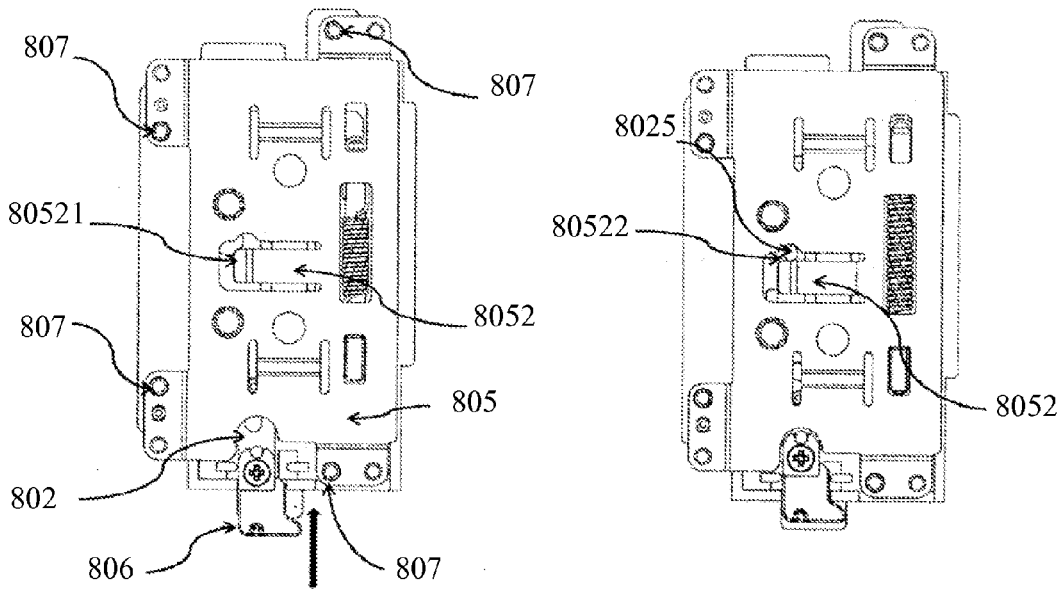
FIGS. 22A and 22B are rear views of the grip mounting unit relating to the embodiment 2.
Figures 23A, 23B:
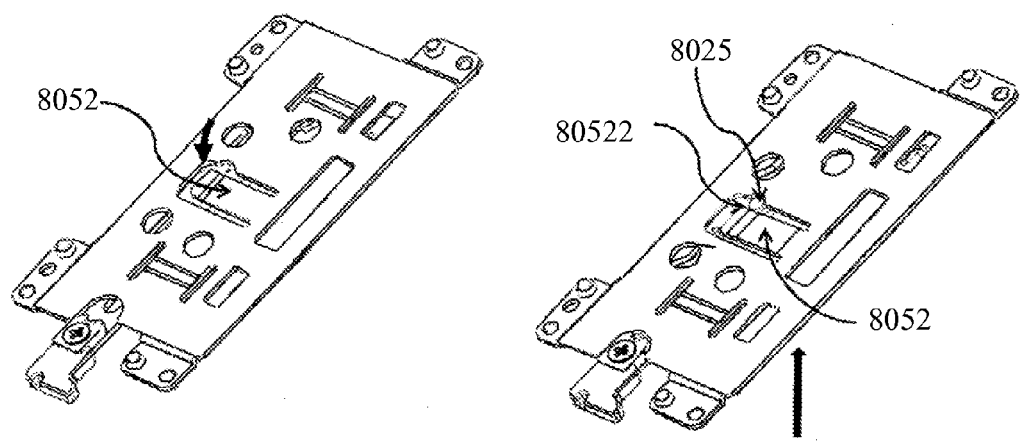
FIGS. 23A and 23B are perspective views of a substantial part of the grip mounting unit relating to the embodiment 2.

Next, the operation of the grip mounting unit 80 is explained in detail. FIGS. 22A and 22B are rear views of the grip mounting unit 80. In other words, these figures illustrate the grip mounting unit 80 seen from a battery housing 705 side. FIGS. 23A and 23B are perspective views of a substantial part of the grip mounting unit 80. In FIGS. 23A and 23B, the holding member 805 is fixed to the base 801 illustrated in FIGS. 20A and 20B by the fixing screws 807.

In the grip mounting unit 80, the first moving member 802 and the operation member 806 fixed to the first moving member 802 by the screw move in a vertical direction. FIG. 22B illustrates a state that the first moving member 802 and the operation member 806 move in an arrow direction in FIG. 22A from a state depicted in FIG. 22A.

In FIG. 22A, the restricting portion 8052 of the holding member 805 is obliquely bent toward a base 801 side relative to the body surface 8051. When the holding member 805 is attached to the base 801, the restricting portion 8052 is urged to a first moving member 802 side. In other words, the restricting portion 8052 is urged in an arrow direction in FIG. 23A. Then, a surface 80521 of the restricting portion 8052 engages with a tip 80251 of the engagement projection 8025 provided on the first moving member 802.

The first moving member 802 and the operation member 806 moves from the state depicted in FIG. 22A to the state depicted in FIG. 22B in a state that tip 80251 of the engagement projection 8025 engages with the surface 80521 of the restricting portion 8052.

When the engagement projection 8025 arrives to an end face 80522 of the restricting portion 8052, the restricting portion 8052 moves in a depth direction of the paper in FIGS. 22A and 22B by restoring force of the restricting portion 8052.

In other words, the restricting portion 8052 deforms in the arrow direction in FIG. 23A and changes to the state depicted in FIG. 23B. Therefore, the end face 80522 of the restricting portion 8052 abuts against the engagement projection 8025 and the first moving member 802 is held on the state depicted in FIG. 22B.

When the first moving member 802 moves the state depicted in FIG. 22A to the state depicted in FIG. 22B, the axis portion 8034 of the second moving member 803 engaged with the long hole 8023 of the first moving member 802 moves in conjunction with a movement of the first moving member 802. In other words, the second moving member 803 rotates in the arrow direction of FIG. 20A around the axis 8011 so that the state depicted in FIG. 20B changes to the state depicted in FIG. 20A.

In this example, when the surface 80521 of the restricting portion 8052 is pushed so that the restricting portion 8052 moves by a height of the engagement projection 8025 in a depth direction of the paper the state depicted in FIG. 22B, the engagement between the engagement projection 8025 and the end face 80522 of the restricting portion 8052 is released. Then, the first moving member 802 moves in a down direction of the paper by an urging force of the urging member 804, and the grip mounting unit 80 becomes the state depicted in FIG. 22A.

Figures 24A, 24B:
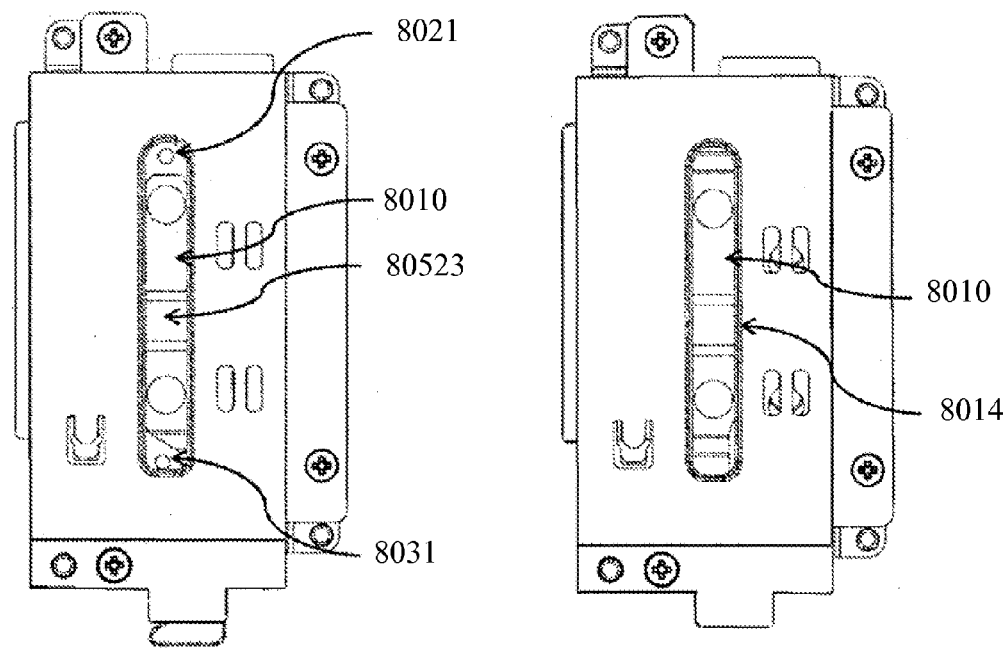
FIGS. 24A and 24B are front views of the grip mounting unit relating to the embodiment 2.

FIGS. 24A and 24B are front views of the grip mounting unit 80. FIGS. 24A and 24B illustrate the grip mounting unit 80 seen from a side opposite to a side seen in FIG. 22A and seen from a side opposite to a side seen in FIG. 22B. When the first and second moving members 802, 803 are positioned at a first position, the grip mounting unit 80 becomes the states of FIGS. 22A and 24A. When the first and second moving members 802, 803 are positioned at a third position, the grip mounting unit 80 becomes the states depicted in FIGS. 22B and 24B.

The base 801 includes a grip mounting portion 8010 attachable to the grip. In a state depicted in FIG. 24A, the first engaging portion 8021 of the first moving member 802 and the second engaging portion 8031 of the second moving member 803 are positioned in a projection surface of the grip mounting portion 8010. In a state depicted in FIG. 24B, the first engaging portion 8021 of the first moving member 802 and the second engaging portion 8031 of the second moving member 803 are evacuated from the projection surface of the grip mounting portion 8010.

Next, the grip selectively mountable to the image pickup apparatus body 10 is explained in detail.

Figures 25A, 25B, 25C:
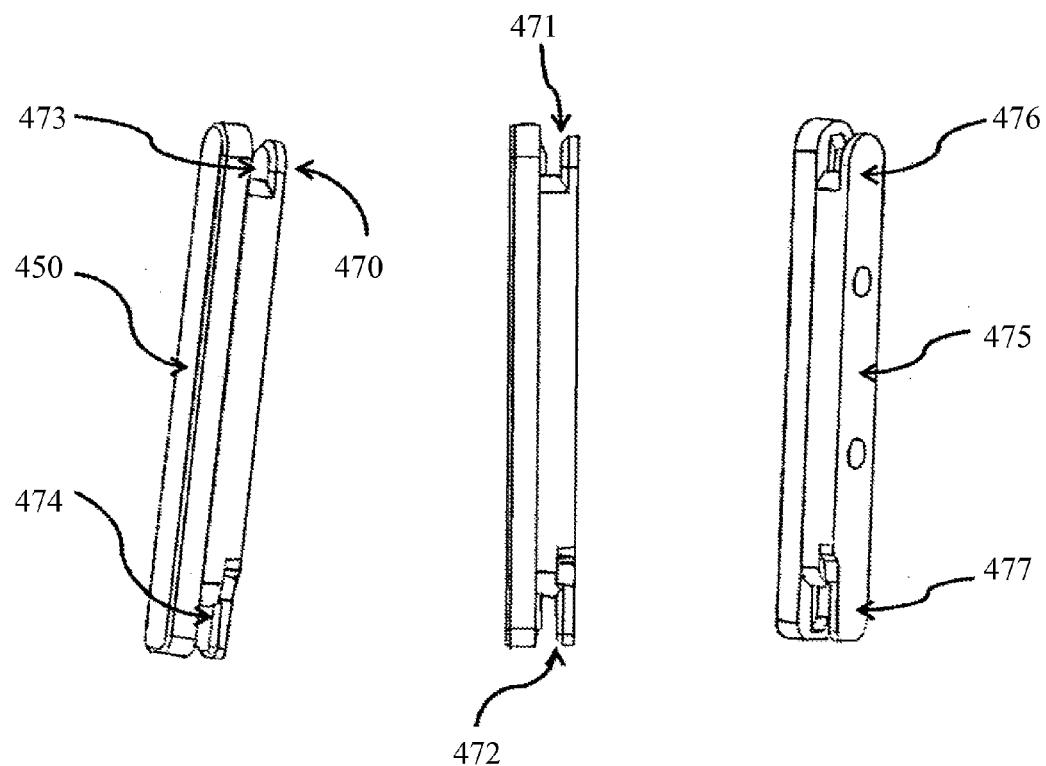
FIGS. 25A to 25C are schematic diagrams illustrating a small size grip.

FIGS. 25A to 25C are schematic diagrams illustrating a small size grip 45. FIG. 25A is a perspective view seen from a front side, FIG. 25B is a side view, and FIG. 25C is a perspective view seen from a back side.

The small grip 45 includes a body cover 450 and an attaching plate 470. A pair of engaged portions 471, 472 are formed on both ends of the attaching plate 470. Abutting surfaces 473, 474 are respectively formed inside of the pair of engaged portions 471, 472. Additionally, the attaching plate 470 includes a first pressing surface 475, a second pressing surface 476, and a third pressing surface 477. The first pressing surface 475 abuts against the surface 80521 of the restricting portion 8052 formed on the holding member 805. The second pressing surface 476 abuts against the first grip urging portion 8053 of the holding member 805. The third pressing surface 477 abuts against the second grip urging portion 8054 of the holding member 805.

Figures 26A, 26B, 26C:
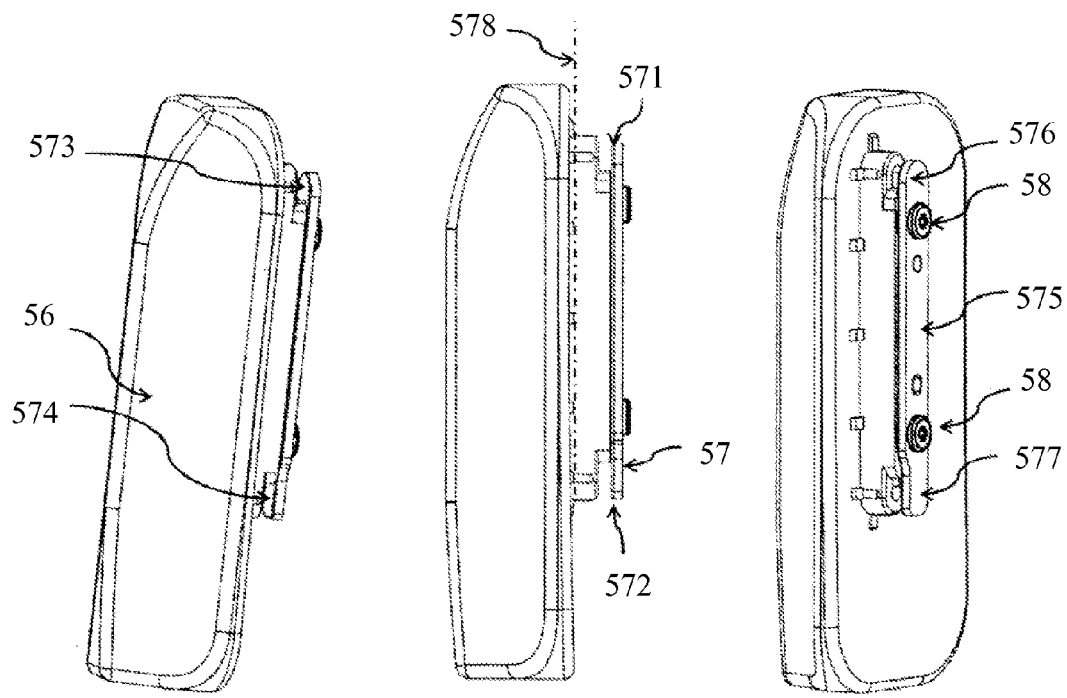
FIGS. 26A to 26C are schematic diagrams illustrating a large size grip.

FIGS. 26A to 26C are schematic diagrams illustrating a large size grip 55. FIG. 26A is a perspective view seen from a front side, FIG. 26B is a side view, and FIG. 26C is a perspective view seen from a back side.

The large grip 55 includes a grip portion 56 formed by resin material having a high friction coefficient, a metal plate 57 which is an attaching portion to the grip mounting unit 80, and a screw 58 fixing the grip portion 56 and the metal plate 57.

A pair of engaged portions 571, 572 are formed on both ends of the metal plate 57. An abutting surface 573 is formed inside of the engaged portions 571. An abutting surface 574 is formed inside of the engaged portion 572. Additionally, the metal plate 57 includes a first pressing surface 575, a second pressing surface 576, and a third pressing surface 577. The first pressing surface 575 abuts against the surface 80523 of the restricting portion 8052 arranged in the projection surface of the grip mounting portion 8010. In other words, the surface 80523 of the restriction 8052 formed on the holding member 805 serves as a part of the holding member arranged in the projection surface of the grip mounting portion 8010. The second pressing surface 576 abuts against the first grip urging portion 8053 of the holding member 805. The third pressing surface 577 abuts against the second grip urging portion 8054 of the holding member 805.

Next, the operation when detaching and attaching the grip is explained. First, a grip attachment operation is explained. The grip attachment relating to this example is performed by inserting the grip into the grip mounting portion 8010 of the base 801.

Figure 27:
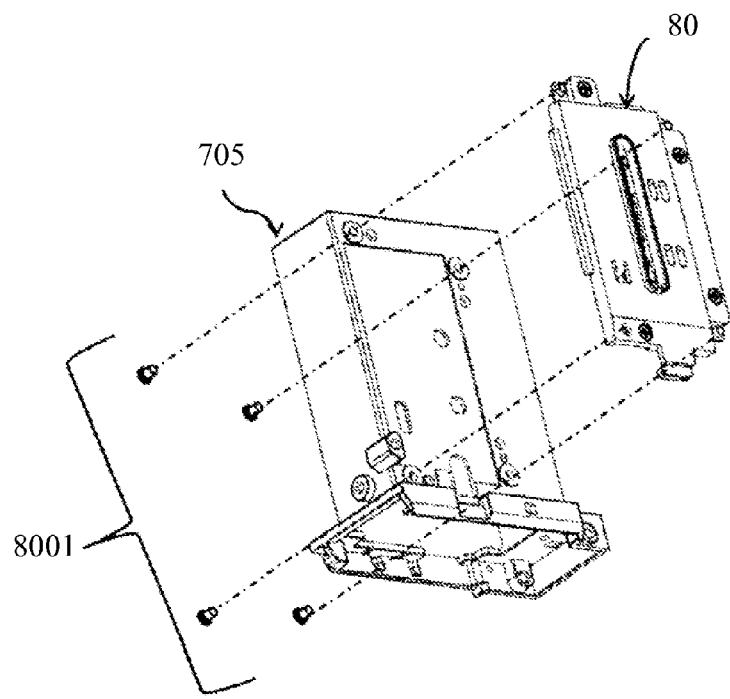
FIG. 27 is a schematic diagram illustrating a state that the grip mounting unit relating to the embodiment 2 is being mounted to a battery housing by a fixed screw.

FIG. 27 is a schematic diagram illustrating a state that the grip mounting unit 80 is being mounted to a battery housing 705 by a fixed screw 8001.

FIGS. 28A to 28E are schematic diagrams illustrating a first state of the grip mounting unit 80. The grip mounting unit 80 becomes the state illustrated in FIGS. 22B, 23B, and 24B and is capable of inserting the grip. The metal plate 57 of the large grip 55 is only illustrated in FIGS. 28A to 28E.

Figure 28D:
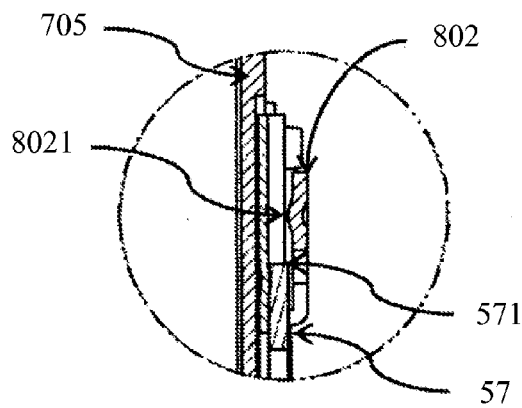
Figure 28E:
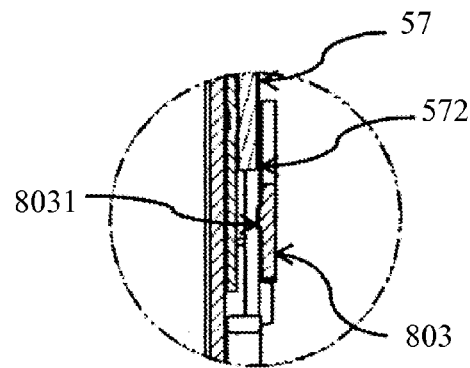

FIG. 28A illustrates a front view of the grip mounting unit 80. The base 801 is not illustrated so as to explain. FIG. 28B illustrates a state that the large grip 55 is inserted into the grip mounting unit 80 in FIG. 28A. FIG. 28C illustrates a sectional view in A-A of FIG. 28B, FIG. 28D illustrates an enlarged view of "d" portion in FIG. 28C, and FIG. 28E illustrates an enlarged view of "e" portion in FIG. 28C.

When the large grip 55 is inserted into the grip mounting portion 8010 formed on the base 801, the first pressing surface 575 of the large grip 55 pushes the surface 80523 of the restriction portion 8052 which is exposed from the grip mounting portion 8010. Therefore, the engagement of the engagement projection 8025 of the first moving member 802 and the end face 80522 of the restriction portion 8052 is released, and the engagement projection 8025 moves on the surface 80521 of the restriction portion 8052 so that the grip mounting unit 80 becomes the states illustrated in FIGS. 29A to 29I.

FIGS. 29A to 29I are schematic diagrams illustrating a second state of the grip mounting unit 80. The metal plate 57 of the large grip 55 is only illustrated in FIGS. 29A to 29I.

Figure 29A:
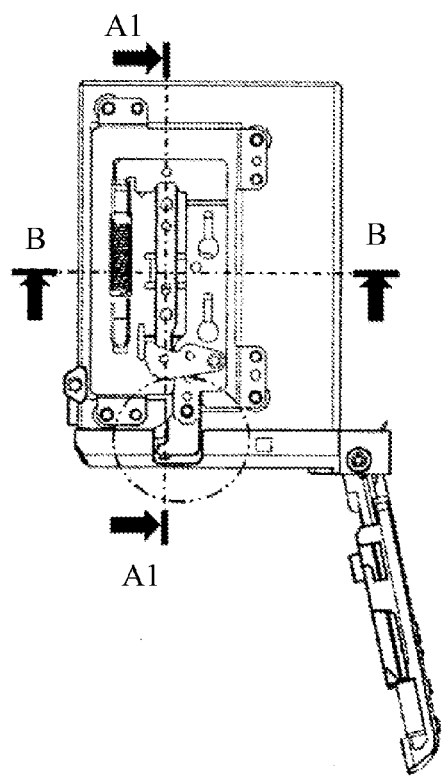
FIGS. 29A to 29I are schematic diagrams illustrating a second state of the grip mounting unit relating to the embodiment 2.
Figure 29B:
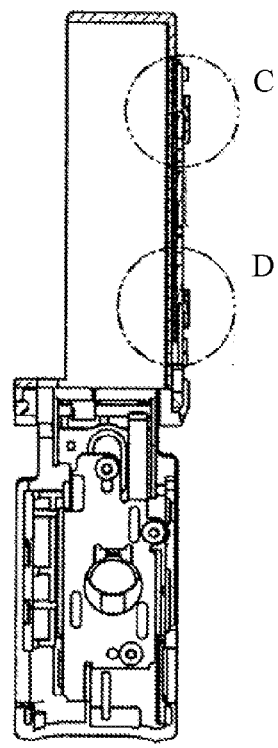
Figure 29C:
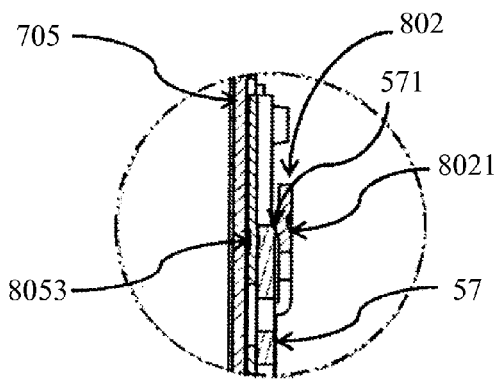
Figure 29D:
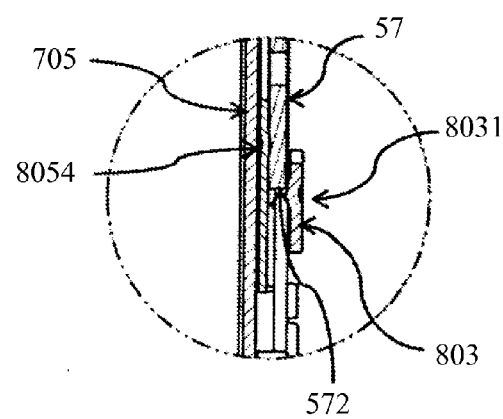
Figure 29E:
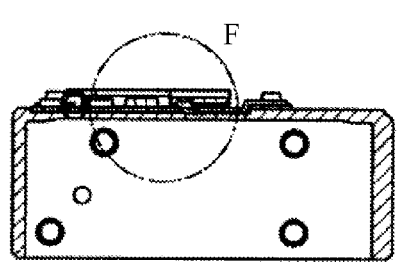
Figure 29F:
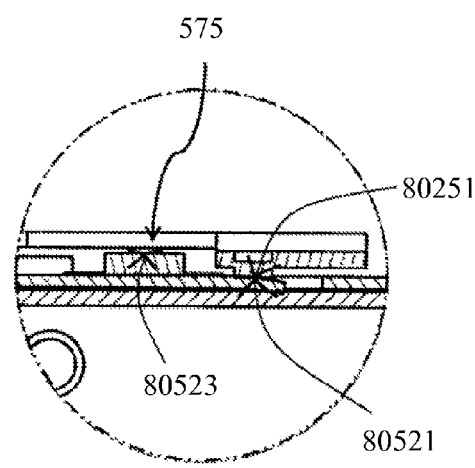

As illustrated in FIG. 29A, the lid 701 becomes the open state. FIG. 29B illustrates a sectional view in A1-A1 of FIG. 29A, FIG. 29C illustrates an enlarged view of "c" portion in FIG. 29B, FIG. 29D illustrates an enlarged view of "d" portion in FIG. 29B, FIG. 29E illustrates a sectional view in B-B of FIG. 29A, and FIG. 29F illustrates an enlarged view of "f" portion in FIG. 29E.

Figure 29G:
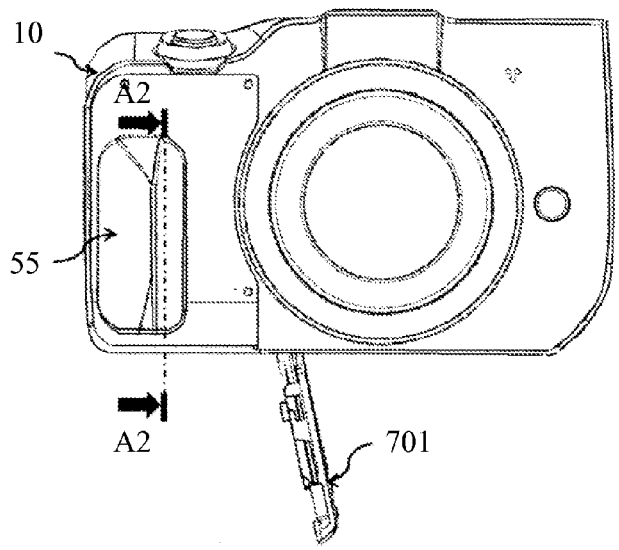
Figures 29H, 29I:
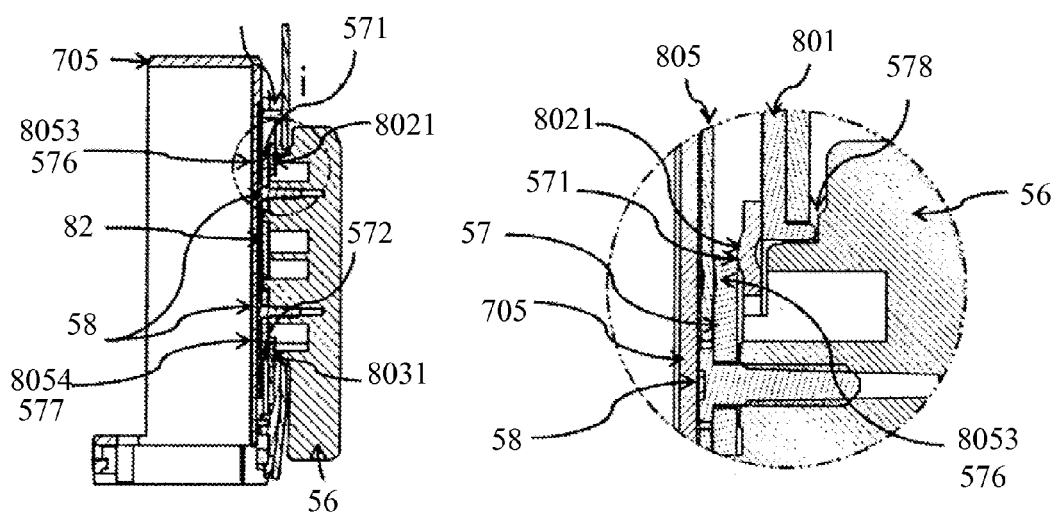

FIG. 29G is a front view illustrating the image pickup apparatus body 10, the grip portion 56 of the large grip 55, and the base 801 of the grip mounting unit 80 relative to the state depicted in FIG. 29A. FIG. 29H illustrates a sectional view in A2-A2 of FIG. 29G. FIG. 29I illustrates an enlarged view of "i" portion in FIG. 29H.

When the engagement between the engagement projection 8025 of the first moving member 802 and the end face 80522 of the restriction portion 8052 is released, the first moving member 802 moves to a position illustrated in FIG. 29A by the urging force of the urging member 804 as discussed above. The first and second engaging portions 8021, 8031 respectively abut against the engaged portion 571 of an upper end of the metal plate 57, and the engaged portion 572 of a lower end of the metal plate 57 so as to restrict both movements of the first and second moving members 802, 803. When the first and second moving members 802, 803 are positioned at a second position, the grip mounting unit 80 becomes the above state.

In this example, resultant force of a force that the first engaging portion 8021 runs on the abutting surface 573 of the engaged portion 571 and a force that the second engaging portion 8031 runs on the abutting surface 574 of the engaged portion 572 is larger than the urging force of the urging member 804. The urging force of the urging member 804 thus moves the first and second moving members 802, 803 until the first and second engaging portions 8021, 8031 respectively abut against the engaged portions 571, 572.

Balance between resultant force of a force that the first engaging portion 8021 runs on the abutting surface 573 and a force that the second engaging portion 8031 runs on the abutting surface 574, and the urging force of the urging member 804 restricts both movements of the first and second moving members 802, 803. The grip mounting unit 80 becomes mid-state from the state depicted in FIG. 24B to the state depicted in FIG. 24A.

Then, the first and second grip urging portions 8053, 805 of the holding member 8054 respectively abut against the second and third pressing surfaces 576, 577 of the metal plate of the large grip 55. Therefore, the large grip 55 is urged in a direction away from depart from the image pickup apparatus body 10, and a gap between a butting surface 578 of the large grip 55 and a butting surface 8014 of the image pickup apparatus body 10 is formed. Then, when the user grasps the image pickup apparatus body 10 and holds the large grip 55, the large grip 55 sink into the gap between the butting surface 578 of the large grip 55 and the butting surface 8014 of the image pickup apparatus body 10.

FIGS. 30A and 30B are schematic diagrams illustrating the second state of the grip mounting unit 80. In these figures, as illustrated in FIG. 30A, an opening of the battery housing 705 is closed by rotating the lid 701 on an image pickup apparatus body side from the state depicted in FIG. 29G that the battery 90 is removably inserted. Then, as illustrated in FIG. 30B which is an enlarged view of "b" portion in FIG. 30A, the first abutting portion 702 of the lid 701 does not abut against the second abutting portion 8064 of the operation member 806. A positional relationship among the first moving member 802, the second moving member 803, and the metal plate 57 of the large grip 55 is the same as positional relationship in FIGS. 29A to 29I. The metal plate 57 of the large grip 55 is only illustrated in FIGS. 30A and 30B.

FIGS. 31A to 31F are schematic diagrams illustrating a third state of the grip mounting unit 80. In these figures, detachment of the large grip 55 is finished. The metal plate 57 of the large grip 55 is illustrated in FIGS. 31A to 31E.

FIG. 31A is the state that the lid 701 is moved in an arrow direction of FIG. 31A from the state depicted in FIG. 30A, and the lid 701 becomes the close state. Movement from the open state of the lid 701 in FIG. 29G to the close state of the lid 701 in FIG. 31A through the state of the lid 701 in FIG. 30A is performed by a set of user operations.

Figure 31C:
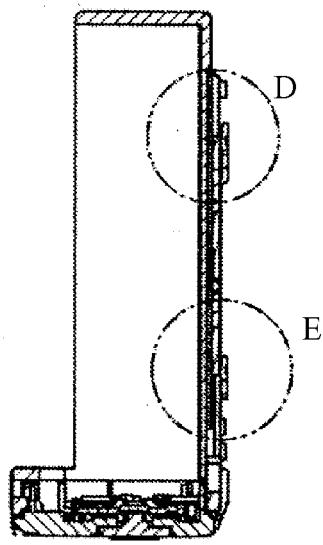
Figure 31D:
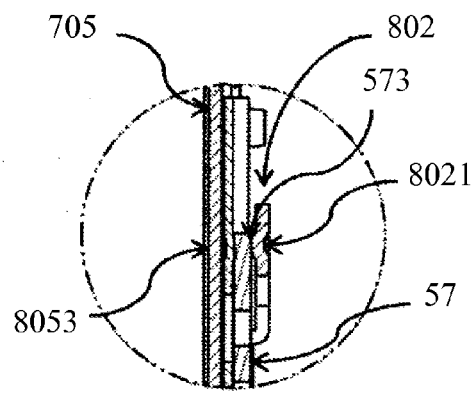
Figure 31E:
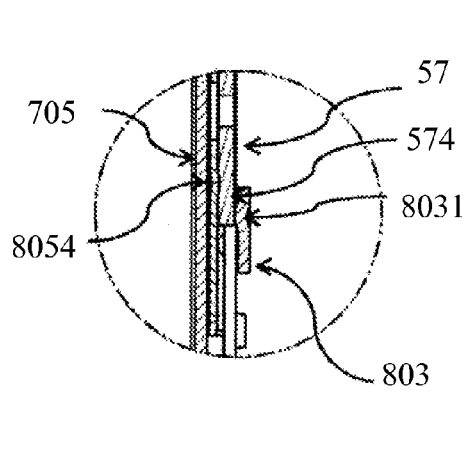
Figure 31F:
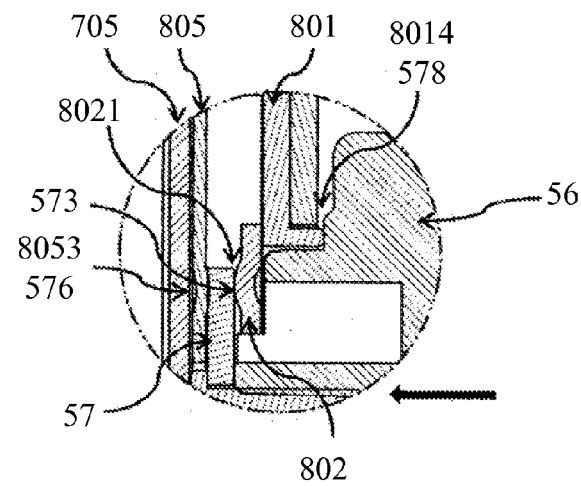

FIG. 31B is an enlarged view of "b" portion in FIG. 31A, FIG. 31C is a sectional view in A-A of FIG. 31A, FIG. 31D is an enlarged view of "d" portion in FIG. 31C, and FIG. 31E is an enlarged view of "e" portion of FIG. 31C. FIG. 31F illustrates the state illustrating the grip portion 56 of the large grip 55 and the base 801 of the grip mounting unit 80 relative to the state depicted in FIG. 31D.

When the operation member 806 moves from the state depicted in FIG. 30A to the state depicted in FIG. 31A, the first abutting portion 702 abuts against the second abutting portion 8064 of the operation member 806 as illustrated in FIG. 31B. Then, the operation member 806 moves in an arrow direction of FIG. 31B relative to the state depicted in FIG. 30B. At the same time, the first moving member 802 moves in an arrow H direction of FIG. 31A. The second moving member 803 also rotates in an arrow J direction of FIG. 31A. These movements abut the abutting surface 573 of the metal plate 57 of the large grip 55 against the first engaging portion 8021 of the first moving member 802. The abutting surface 574 of the metal plate 57 of the large grip 55 abuts against the second engaging portion 8031 of the second moving member 803. Then, the metal plate 57 is moved on an image pickup apparatus body 10 side illustrated in an arrow direction of FIG. 31F so that the butting surface 578 of the large grip 55 abuts against the butting surface 8014 of the image pickup apparatus body 10. Even if the user grasps the image pickup apparatus body 10 and holds the large grip 55, the large grip 55 does not sink since there is no gap between the butting surface 578 of the large grip 55 and the butting surface 8014 of the image pickup apparatus body 10.

Figure 32:
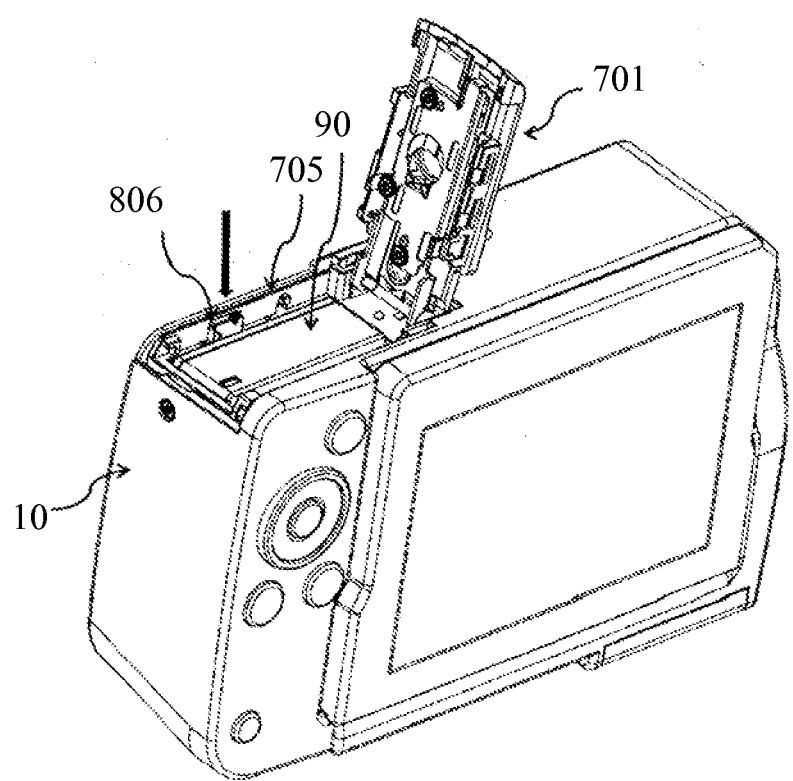
FIG. 32 is a perspective view of a substantial part when detaching the grip.

Next, detachment operation of the grip is explained using FIG. 32. FIG. 32 is a perspective view of a substantial part when detaching the grip.

First, when the lid 701 is opened, the battery housing 705 is exposed as illustrated in FIG. 32. Then, the user pushes the operation member 806 in an arrow direction of the figure (the same direction as inserting direction of the battery 90) so as to detach the grip since the operation member 806 fixed to the first moving member 802 by the screw is exposed.

As explained above, in this example, optimum size grip according to the lens is selectively detachable with the large grip is selected to detach when using the large lens, and the small grip is selected to detach when using the small lens. In other words, small image pickup apparatus having an optimum grasping performance is provided.

In the image pickup apparatus in this example, attachment of the grip is performable by two operations, which are insertion of the grip and closing of the battery lid so as to locking the battery lid to the camera. Additionally, detachment of the grip is performable by two operations for pushing the operation member after opening the battery lid which are the same operation as interchange of the lens.

As explained above, in this example, optimum size grip according to the lens is selectively detachable with the same labor as interchange of the lens. Therefore, the large grip is mountable when using the large lens and the small grip is mountable when using the small lens. In other words, small image pickup apparatus having an optimum grasping performance is provided.

Additionally, the grip does not sink when grasping the grip since there is no gap between the butting surface of the image pickup apparatus and the butting surface of the grip when attaching the grip. Therefore, the invention can miniaturize the size of the body and increase grasping performance.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2013-259614, filed on Dec. 16, 2013, and 2013-259613, filed on Dec. 16, 2013, which are hereby incorporated by reference herein in their entirety.

What is claimed is:

1. An image pickup apparatus where a grip mounting portion to detachably mount a grip is formed, the image pickup apparatus comprising:
   a locking member configured to move between a locking position where the grip attached to the grip mounting portion is locked and a release position where locking to the grip is released;
   a holding member partially arranged in a projection surface of the grip mounting portion and configured to engage with the locking member so as to hold the locking member at the release position;
   an urging member configured to urge the locking member toward the locking position; and
   an openable lid,
   wherein mounting the grip to the grip mounting portion releases engagement between the holding member and the locking member so that the locking member moves from the release position to the locking position,
   wherein the holding member holds the locking member at the release position against urging force of the urging member,
   wherein an operating portion of the locking member is arranged so as to be covered with the lid being a close state, and
   wherein when the operation portion is operated, the locking member moves from the locking position to the release position against the urging force of the urging member so that the holding member holds the locking member at the release position.

2. The image pickup apparatus according to claim 1, wherein the locking member includes an arm portion arranged so as to overlap with a part of the holding member in the projection surface of the grip mounting portion, and
   wherein the grip abuts against the arm portion so that the engagement between the holding member and the locking member is not released when the grip is not mounted to the grip mounting portion in a normal mounting direction.

3. An image pickup apparatus where the grip mounting portion to detachably mount a grip is formed, the image pickup apparatus comprising:
   a locking member configured to move between a locking position where the grip attached to the grip mounting portion is locked and a release position where locking grip is released; and
   a holding member partially arranged in a projection surface of the grip mounting portion and configured to engage with the locking member so as to hold the locking member at the release position, wherein mounting the grip to the grip mounting portion releases engagement between the holding member and the locking member so that the locking member moves from the release position to the locking position, and wherein when the locking member moves from the locking position to the release position, a part of the holding member arranged in the projection surface of the grip mounting portion presses so as to eject the grip from the grip mounting portion.

4. A grip detachably mounted to the image pickup apparatus according to claim 1 comprising: a protruding portion configured to press a part of the holding member arranged in the projecting surface of the grip mounting portion when the grip is attached to the image pickup apparatus.

5. An image pickup apparatus where a grip mounting portion to detachably mount a grip including an engaged portion is formed, the image pickup apparatus comprising:
a moving member including an engaging portion engaging with the engaged portion and configured to move at a first position where the engaging portion is not engaged with the engaged portion, at a second position where the engaging portion engages with the engaged portion and there is a gap between the grip and the image pickup apparatus, and at a third position where the engaging portion engages with the engaged portion and the gap is smaller than that at the second position;
a holding member partially arranged in a projection surface of the grip mounting portion and configured to engage with the moving member so as to hold the moving member at the first position;
a urging member configured to urge the moving member toward the third position, and
and openable lid, wherein attachment the grip with the grip mounting portion releases engagement between the holding member and the moving member so that the moving member moves from the first position to the second position by an urging force of the urging member, and subsequently moves the moving member from the second position to the third position, wherein the operating portion of the moving member is arranged so as to be covered with the lid being a close state, and wherein the moving member moves from the second position to the third position when the lid changes from an open state to the close state.

6. The image pickup apparatus according to claim 5, wherein when the operation portion is operated, the moving member moves from the second position to the first position against the urging force of the urging member so that the holding member engages with the moving member.

7. The image pickup apparatus according to claim 5,
wherein the grip mounting portion is formed on a front of the image pickup apparatus, and
wherein the lid is formed on a bottom of the image pickup apparatus.

8. The image pickup apparatus according to claim 5, wherein the lid opens and closes a battery housing capable of housing a battery.

9. A grip detachably mounted to the image pickup apparatus according to claim 3 comprising: a protruding portion configured to press the part of the holding member arranged in the projecting surface of the grip mounting portion when the grip is attached to the image pickup apparatus.

* * * * *